United States Patent
Pan et al.

(10) Patent No.: US 12,132,603 B2
(45) Date of Patent: Oct. 29, 2024

(54) DATA PROCESSING METHOD, APPARATUS, AND SYSTEM, AND STORAGE MEDIUM

(71) Applicant: Huawei Technologies Co., Ltd., Shenzhen (CN)

(72) Inventors: Jiyu Pan, Beijing (CN); Zhidong Yin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/360,899

(22) Filed: Jul. 28, 2023

(65) Prior Publication Data

US 2023/0370318 A1 Nov. 16, 2023

Related U.S. Application Data

(63) Continuation of application No. PCT/CN2021/134273, filed on Nov. 30, 2021.

(30) Foreign Application Priority Data

Jan. 28, 2021 (CN) .......................... 202110119289.9

(51) Int. Cl.
*H04L 41/0246* (2022.01)
*H04L 41/14* (2022.01)

(52) U.S. Cl.
CPC .......... *H04L 41/0246* (2013.01); *H04L 41/14* (2013.01)

(58) Field of Classification Search
CPC ........................... H04L 41/0246; H04L 41/14
See application file for complete search history.

(56) References Cited

U.S. PATENT DOCUMENTS

| | | | | |
|---|---|---|---|---|
| 10,869,209 | B2* | 12/2020 | Hahn | H04W 56/001 |
| 2019/0357137 | A1* | 11/2019 | Shah | H04W 48/20 |
| 2020/0220602 | A1 | 7/2020 | Li et al. | |
| 2020/0228413 | A1 | 7/2020 | Chong et al. | |
| 2020/0228422 | A1 | 7/2020 | Chong | |

(Continued)

FOREIGN PATENT DOCUMENTS

| | | |
|---|---|---|
| CN | 109600243 A | 4/2019 |
| CN | 109600790 A | 4/2019 |
| CN | 110019511 A | 7/2019 |

(Continued)

OTHER PUBLICATIONS

Ali et al, "URLLC for 5G and Beyond: Requirements, Enabling Incumbent Technologies and Network Intelligence", IEEE Access, vol. 9, Jan. 1, 2021.*

(Continued)

*Primary Examiner* — Todd L Barker
(74) *Attorney, Agent, or Firm* — Conley Rose, P.C.

(57) ABSTRACT

A data processing method includes receiving a first dataset sent by a network element, where the first dataset includes a plurality of pieces of first data obtained by the network element; obtaining, based on the first dataset, at least one data feature corresponding to the plurality of pieces of first data; and sending trigger information to the network element, where the trigger information includes at least one data feature and/or at least one feature type, and at least one feature type is related to at least one data feature.

17 Claims, 9 Drawing Sheets

(56) References Cited

U.S. PATENT DOCUMENTS

2020/0374942 A1* 11/2020 Sivavakeesar ........ H04W 68/00

FOREIGN PATENT DOCUMENTS

CN        110502398 A     11/2019
CN        111901135 A     11/2020

OTHER PUBLICATIONS

Araniti et al, "Multicasting over Emerging 5G Networks: Challenges and Perspectives", IEEE Network, vol. 31, Issue: 2, Apr. 7, 2017.*
Sabella et al, "Designing the 5G network infrastructureL a flexible and reconfigurable architecture based on context and content information", Aug. 13, 2018.*
S2-186724, Samsung, a solution to provide the available analytic information metadata, SA WG2 Meeting #128, Jul. 2-6, 2018, 3 pages.

* cited by examiner

DATA PROCESSING METHOD, APPARATUS, AND SYSTEM, AND STORAGE MEDIUM

CROSS-REFERENCE TO RELATED APPLICATIONS

This application is a continuation application of International Patent Application No. PCT/CN2021/134273, filed on Nov. 30, 2021, which claims priority to Chinese Patent Application No. 202110119289.9, filed on Jan. 28, 2021. The disclosures of the aforementioned applications are hereby incorporated by reference in their entireties.

TECHNICAL FIELD

This application relates to the communication field, and in particular, to a data processing method, apparatus, and system, and a storage medium.

BACKGROUND

A network element may collect a plurality of pieces of data corresponding to a key performance indicator (KPI) related to a service and/or a network. Usually, the network element may periodically perform collection, to obtain the plurality of pieces of data corresponding to the KPI, analyze whether the plurality of pieces of data corresponding to the KPI are abnormal, and determine, based on an analysis result, whether the service or the network is risky.

A network environment in which a network element is located is ever-changing. After the network environment changes, data collected by the network element changes accordingly. This makes it difficult for the network element to analyze whether the collected data is abnormal and reduces accuracy of analyzing the collected data.

SUMMARY

This application provides a data processing method, apparatus, and system, and a storage medium, to improve accuracy of analyzing data. The technical solutions are as follows.

According to a first aspect, this application provides a data processing method. The method includes receiving a first dataset sent by a network element, where the first dataset includes a plurality of pieces of first data obtained by the network element; obtaining, based on the first dataset, at least one data feature corresponding to the plurality of pieces of first data; and sending trigger information to the network element, where the trigger information includes at least one data feature and/or at least one feature type, and at least one feature type is related to at least one data feature.

At least one data feature is obtained based on the first dataset, at least one data feature corresponds to data behavior of the first data in the first dataset, and at least one feature type is obtained based on at least one data feature. Even if data collected by the network element changes due to a change of a network environment, it can be learned through analysis based on the foregoing method that the data behavior in the first dataset changes. A corresponding feature type is obtained by using at least one data feature of the data in the first dataset. In an example, when receiving the trigger information, the network element obtains at least one feature type based on the trigger information, and a data metric obtained based on at least one feature type and a second dataset can accurately reflect a network status. In an example, the foregoing method reduces difficulty of analyzing data in the second dataset, and improves accuracy of analyzing the data in the second dataset.

In a possible implementation, at least one feature type is obtained based on at least one data feature and a first correspondence. Because the first correspondence includes at least one data feature and at least one feature type, at least one feature type can be quickly obtained based on the first correspondence. This simplifies implementation complexity, thereby sending the trigger information to the network element in a timely manner.

In another possible implementation, at least one feature type is obtained based on at least one data feature, the first correspondence, and at least one data type. At least one data type includes a type to which the first data in the first dataset belongs, and the first correspondence includes at least one data feature, at least one data type, and/or at least one feature type. In an example, the obtained at least one feature type is associated with at least one data type, to improve accuracy of obtaining the feature type.

In another possible implementation, the trigger information includes at least one data feature and/or at least one data type, and at least one data type includes a type to which the first data in the first dataset belongs. Because the trigger information includes at least one data type, the network element obtains at least one feature type based on at least one data type, to improve accuracy of obtaining at least one feature type.

In another possible implementation, the trigger information further includes an object identifier of at least one first object, and at least one first object is located in the network element. In an example, the network element can obtain the second dataset based on the object identifier of at least one first object, and the second dataset includes second data obtained by at least one first object. The data in the second dataset is obtained by at least one first object, and at least one first object may be associated with the first dataset. This can improve accuracy of analyzing the data in the second dataset.

In another possible implementation, at least one data feature includes one or more pieces of the following information such as a data waveform feature corresponding to the first data in the first dataset, a data content feature in the first dataset, and an object identifier of at least one second object, where at least one second object includes an object for obtaining each piece of first data in the first dataset.

In another possible implementation, the method is executed by a data processing system, a controller, or a management device.

In another possible implementation, the first dataset includes the second dataset or partial data in the second dataset, or the second dataset includes data obtained after the network element sends the first dataset.

According to a second aspect, this application provides a data processing method. The method includes obtaining a first dataset, where the first dataset includes a plurality of pieces of first data; obtaining at least one feature type based on the first dataset, where at least one feature type corresponds to at least one data feature corresponding to the plurality of pieces of first data; and obtaining a data metric based on at least one feature type and a second dataset, where the second dataset includes a plurality of pieces of second data.

At least one data feature is obtained based on the first dataset, at least one data feature corresponds to data behavior of the first data in the first dataset, and at least one feature type is obtained based on at least one data feature. Even if obtained data changes due to a change of a network environment, it can be learned through analysis based on the foregoing method that the data behavior in the first dataset changes. A corresponding feature type is obtained by using at least one data feature of the data in the first dataset. The data metric obtained based on at least one feature type and the second dataset can accurately reflect a network status. In an example, the foregoing method reduces difficulty of analyzing the data in the second dataset, and improves accuracy of analyzing the data in the second dataset.

In a possible implementation, the first dataset is sent, where the first dataset is used by a receiver of the first dataset to obtain at least one data feature and/or at least one feature type; trigger information is received, where the trigger information includes at least one data feature and/or at least one feature type; and at least one feature type is obtained based on the trigger information. In an example, a network element can obtain at least one data feature and/or at least one feature type without being based on the first dataset. In an example, when a computing capability and a storage capability of the network element are low, obtaining of at least one feature type by the network element is not affected.

In another possible implementation, the trigger information includes at least one data feature; and at least one feature type is obtained based on at least one data feature and a first correspondence, where the first correspondence includes at least one data feature and at least one feature type. Because the first correspondence includes at least one data feature and at least one feature type, at least one feature type can be quickly obtained based on the first correspondence. This simplifies implementation complexity, thereby quickly obtaining at least one feature type.

In another possible implementation, the trigger information further includes at least one data type, and at least one data type includes a type to which the first data in the first dataset belongs; and at least one feature type is obtained based on at least one data feature, at least one data type, and the first correspondence, where the first correspondence includes at least one data feature, at least one data type, and at least one feature type. Because the trigger information further includes at least one data type, the obtained at least one feature type is associated with at least one data type, to improve accuracy of obtaining the feature type.

In another possible implementation, the trigger information further includes an object identifier of at least one first object; and the second dataset is obtained based on the object identifier of at least one first object, where the second dataset includes a plurality of pieces of second data obtained by at least one first object. The data in the second dataset is obtained by at least one first object, and at least one first object may be associated with the first dataset. This can improve accuracy of analyzing the data in the second dataset.

In another possible implementation, at least one data feature is obtained based on the first dataset; and at least one feature type is obtained based on at least one data feature and a first correspondence, where the first correspondence includes at least one data feature and at least one feature type. In an example, the network element directly obtains at least one feature type, and does not need to send the first dataset to a first device, to save network resources.

In another possible implementation, at least one data feature includes one or more pieces of the following information such as a data waveform feature corresponding to the first data in the first dataset, a data content feature in the first dataset, and an object identifier of at least one second object, where at least one second object includes an object for obtaining the first data in the first dataset.

In another possible implementation, an abnormality of the second data in the second dataset is determined based on the data metric; and the determined abnormality and/or the data metric is sent.

In another possible implementation, the first dataset includes the second dataset or partial data in the second dataset, or the second dataset includes data obtained after the network element obtains the first dataset.

According to a third aspect, this application provides a data processing apparatus, configured to perform the method according to any one of the first aspect or the possible implementations of the first aspect. Specifically, the apparatus includes units configured to perform the method according to any one of the first aspect or the possible implementations of the first aspect.

According to a fourth aspect, this application provides a data processing apparatus, configured to perform the method according to any one of the second aspect or the possible implementations of the second aspect. Specifically, the apparatus includes units configured to perform the method according to any one of the second aspect or the possible implementations of the second aspect.

According to a fifth aspect, this application provides a data processing device. The device includes a processor and a computer program, and the processor is configured to execute the computer program in a memory, so that the device implements the method according to any one of the first aspect or the possible implementations of the first aspect.

According to a sixth aspect, this application provides a data processing device. The device includes a processor and a computer program, and the processor is configured to execute the computer program in a memory, so that the device implements the method according to any one of the second aspect or the possible implementations of the second aspect.

According to a seventh aspect, this application provides a computer program product. The computer program product includes a computer program, and the computer program is loaded by a computer to implement the method according to any one of the first aspect, the second aspect, the possible implementations of the first aspect, or the possible implementations of the second aspect.

According to an eighth aspect, this application provides a computer-readable storage medium, configured to store a computer program. The computer program is loaded by a processor to perform the method according to any one of the first aspect, the second aspect, the possible implementations of the first aspect, or the possible implementations of the second aspect.

According to a ninth aspect, this application provides a chip, including a memory and a processor. The memory is configured to store computer instructions, and the processor is configured to invoke the computer instructions from the memory and run the computer instructions, to perform the method according to any one of the first aspect, the second aspect, the possible implementations of the first aspect, or the possible implementations of the second aspect.

According to a tenth aspect, this application provides a data processing system. In the system, a data obtaining unit obtains a first dataset, and the first dataset includes a plurality of pieces of first data. A data sending unit sends the first dataset. A data processing unit obtains, based on the first dataset, at least one data feature corresponding to the plurality of pieces of first data. An information sending unit sends trigger information, where the trigger information includes at least one data feature and/or at least one feature type, and at least one feature type is obtained by the data processing unit based on at least one data feature. A type obtaining unit obtains at least one feature type based on the trigger information. A metric obtaining unit obtains a data metric based on at least one feature type and a second dataset, where the second dataset includes a plurality of pieces of second data.

The data processing unit obtains at least one data feature based on the first dataset, at least one data feature corresponds to data behavior of the first data in the first dataset, and at least one feature type is obtained by the data processing unit based on at least one data feature. Even if obtained data changes due to a change of a network environment, it can be learned through analysis based on the foregoing system that the data behavior in the first dataset changes. The type obtaining unit obtains a corresponding feature type by using at least one data feature of the data in the first dataset. In an example, the data metric obtained by the metric obtaining unit based on at least one feature type and the second dataset can accurately reflect a network status. In an example, the foregoing system reduces difficulty of analyzing the data in the second dataset, and improves accuracy of analyzing the data in the second dataset.

In a possible implementation, the data processing unit further obtains at least one feature type based on at least one data feature and a first correspondence, where the first correspondence includes at least one data feature and at least one feature type. Because the first correspondence includes at least one data feature and at least one feature type, the data processing unit can quickly obtain at least one feature type based on the first correspondence. This simplifies implementation complexity, thereby sending the trigger information to a network element in a timely manner.

In another possible implementation, the data processing unit obtains at least one feature type based on at least one data feature, the first correspondence, and at least one data type, where at least one data type includes a type to which the first data in the first dataset belongs, and the first correspondence includes at least one data feature, at least one data type, and at least one feature type. In an example, the obtained at least one feature type is associated with at least one data type, to improve accuracy of obtaining the feature type.

In another possible implementation, the trigger information includes at least one data feature; and the type obtaining unit obtains at least one feature type based on at least one data feature and a first correspondence, where the first correspondence includes at least one data feature and at least one feature type.

In another possible implementation, the trigger information further includes at least one data type, and at least one data type includes a type to which the first data in the first dataset belongs; and the type obtaining unit obtains at least one feature type based on at least one data feature, at least one data type, and the first correspondence, where the first correspondence includes at least one data feature, at least one data type, and at least one feature type. Because the trigger information includes at least one data type, the type obtaining unit obtains at least one feature type based on at least one data type, to improve accuracy of obtaining at least one feature type.

In another possible implementation, the trigger information further includes an object identifier of at least one first object. The second dataset includes a plurality of pieces of second data obtained by at least one first object. The data in the second dataset is obtained by at least one first object, and at least one first object may be associated with the first dataset. This can improve accuracy of analyzing the data in the second dataset.

In another possible implementation, at least one data feature includes one or more pieces of the following information such as a data waveform feature corresponding to the first data in the first dataset, a data content feature in the first dataset, and an object identifier of at least one second object, where at least one second object includes an object for obtaining the first data in the first dataset.

In another possible implementation, the metric obtaining unit further determines an abnormality of the second data in the second dataset based on the data metric; and the data sending unit further sends the determined abnormality and/or the data metric.

In another possible implementation, the first dataset includes the second dataset or partial data in the second dataset, or the second dataset includes data obtained after the first dataset is obtained.

DESCRIPTION OF EMBODIMENTS

The following further describes in detail implementations of this application with reference to accompanying drawings.

Figure 1:
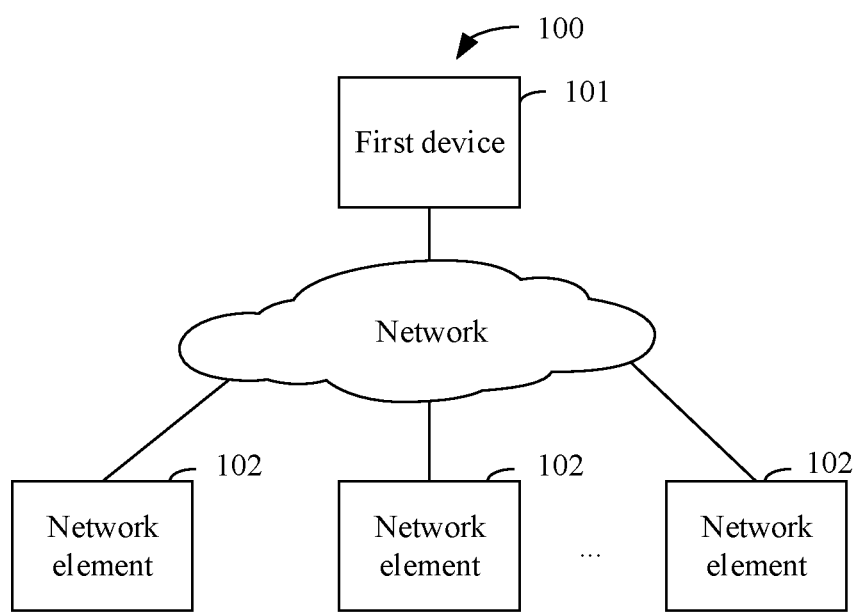
FIG. 1 is a schematic diagram of a network architecture according to an embodiment of this application.

As shown in FIG. 1, an embodiment of this application provides a network architecture 100, including a first device 101 and at least one network element 102, where the first device 101 communicates with each of at least one network element 102.

In some embodiments, the first device 101 and each network element access a network, where the network includes a local area network or a wide area network. In other words, the first device 101 communicates with each network element in the local area network, or the first device 101 may be remotely deployed or deployed in the cloud.

In some embodiments, for each of at least one network element 102, the first device 101 establishes a network connection to the network element, to communicate with the network element. In an example, there are other manners for implementing communication between the first device 101 and the network element, which are not listed one by one herein.

The first device 101 is a network cloud engine (NCE), a data processing system, a controller, a management device, or the like. At least one network element 102 includes one or more of the following network devices such as a probe, a server, a base station, a switch, a gateway, a router, an optical network unit (ONU), an optical line terminal (OLT), a wireless local area network (WLAN) device, a firewall, or the like.

For each of at least one network element 102, the network element 102 includes functions such as data processing and/or service forwarding. The first device 101 includes functions such as analyzing, managing, and/or controlling the network element 102.

A data processing function included in the network element 102 is used as an example. A process in which the network element 102 processes data is as follows. The network element 102 obtains data, and analyzes, based on at least one feature type, whether the data is abnormal, where at least one feature type corresponds to data behavior of the data; and the network element 102 determines, based on an analysis result, whether a service or a network related to the data is risky, where the service includes a service transmitted by the network element 102, and the network includes a network to which the network element belongs.

However, a network environment in which the network element 102 is located is ever-changing. After the network environment in which the network element 102 is located changes, data behavior of the data obtained by the network element 102 may change. In this case, at least one feature type may no longer correspond to changed data behavior. If the network element 102 continues to analyze the obtained data based on at least one feature type, accuracy of analyzing the data is reduced.

The following uses an example in which the network element 102 is a router. It is assumed that data processed by the router is a quantity of routes, and at least one feature type in the router includes an average value. The router obtains a plurality of first quantities of routes, where data behavior of the plurality of first quantities of routes corresponds to the average value. An average value of the plurality of first quantities of routes is obtained, and whether the plurality of first quantities of routes are abnormal is analyzed based on the obtained average value.

After a network environment in which the router is located changes, the router obtains a plurality of second quantities of routes, where the plurality of second quantities of routes no longer correspond to the average value, but correspond to a variance. In this case, the router continues to obtain an average value of the plurality of second quantities of routes, and analyzes, based on the obtained average value, whether the plurality of second quantities of routes are abnormal. As a result, an analysis error occurs, and accuracy of analyzing the plurality of second quantities of routes is reduced.

In some embodiments, to improve accuracy of analyzing data, the first device 101 controls or manages the network element 102. A control or management process is as follows.

The first device 101 obtains a first dataset sent by the network element 102, where the first dataset includes a plurality of pieces of first data obtained by the network element 102. The first device 101 obtains, based on the first dataset, at least one data feature corresponding to the plurality of pieces of first data, and sends trigger information to the network element 102, where the trigger information includes at least one data feature and/or at least one feature type, and at least one feature type is obtained based on at least one data feature. The network element 102 receives the trigger information, obtains at least one feature type based on the trigger information, and analyzes second data in a second dataset based on at least one feature type, where the second dataset includes a plurality of pieces of second data obtained by the network element 102.

The first dataset includes the second dataset or some second data in the second dataset, or the second dataset is data obtained after the network element 102 sends the first dataset. Because at least one feature type is obtained based on the first data obtained by the network element 102, and corresponds to data behavior of the first data in the first dataset, accuracy of analyzing can be improved when the second data in the second dataset is analyzed based on at least one feature type. In an example, the first device 101 controls or manages the network element 102. Certainly, there are other manners in which the first device 101 controls or manages the network element 102, which are not listed one by one herein.

Next, the foregoing router is still used as an example. It is assumed that the first dataset includes the plurality of second quantities of routes obtained by the router. The first device 101 obtains the first dataset, obtains, based on the plurality of second quantities of routes in the first dataset, the feature type that includes the variance, and sends the trigger information to the router, where the trigger information includes the variance. In an example, the router obtains a variance of the second dataset, and analyzes, based on the obtained variance, whether a quantity of routes in the second dataset is abnormal, where the second dataset includes a plurality of quantities of routes obtained by the router after the network environment changes.

For the foregoing dataset (including the first dataset and/or the second dataset), data in the dataset includes data corresponding to at least one KPI.

at least one KPI includes one or more of a quantity of routes, a quantity of lost packets, a quantity of routing entries, a quantity of bit errors, a delay, and the like.

The data behavior of the first data in the first dataset includes data change behavior. For example, the first data in the first dataset may be periodically changed data, oscillation-changed data, trend-changed data, or the like.

at least one data feature reflects the data behavior of the first data in the first dataset. At least one data feature includes a data waveform feature corresponding to the first data in the first dataset, a data content feature in the first dataset, and/or an object identifier of at least one object. At least one object includes an object for obtaining each piece of first data in the first dataset.

The data waveform feature includes one or more of a periodic type, an oscillation type, a horizontal type, a sudden change type, a trend type, and the like.

at least one feature type includes one or more of an average value, a variance, a median, a maximum value, a minimum value, and the like.

In some embodiments, the first device 101 stores a first correspondence, and/or for each of at least one network element 102, the network element 102 stores a first correspondence. The first correspondence includes a data feature and a feature type.

Each record in the first correspondence may be configured by technical personnel, and/or learned by the first device 101 or the network element 102.

In some embodiments, for a record stored in the first correspondence in the first device 101, the record may be configured by technical personnel in advance, the record is generated by the first device 101, and/or the record is sent by another device. The another device includes a network element, a knowledge base (an expert knowledge base and/or an empirical knowledge base), and/or the like. Then, when the first device obtains at least one data feature and at least one feature type, the first device 101 further queries whether a target record is stored in the first correspondence. The target record is a record including at least one data feature and at least one feature type. If the target record is not stored, the first device 101 stores the target record in the first correspondence. Similarly, a record stored in the first correspondence in the network element 102 is also obtained according to the foregoing process, and details are not described herein again.

For any record in the first correspondence, the record includes one or more data features and one or more feature types. For example, refer to the first correspondence shown in the following the table 1. For a $1^{st}$ record in the table 1, a data feature included in the $1^{st}$ record is "periodic type", and a feature type is "average value". For a $2^{nd}$ record in the table 1, the $2^{nd}$ record includes two data features and two feature types, the two data features are "periodic type and oscillation type", and the two feature types are "variance and median".

TABLE 1

| Sequence number | Data feature | Feature type |
|---|---|---|
| 1 | Periodic type | Average value |
| 2 | Periodic type and oscillation type | Variance and median |
| ... | ... | ... |

For the record in the first correspondence, the record may further include one or more data types, and the data type may be a KPI, service data, control information, and/or the like. For example, refer to the first correspondence shown in the following table 2. For a $1^{st}$ record in the table 2, a data feature included in the $1^{st}$ record is "period type", a data type is "quantity of routes", and a feature type is "average value". For a $2^{nd}$ record in the table 2, the $2^{nd}$ record includes two data features, three data types, and two feature types. The two data features are "periodic type and oscillation type", the three data types are "quantity of lost packets, quantity of routes, and delay", and the two feature types are "variance and median".

TABLE 2

| Sequence number | Data feature | Data type | Feature type |
|---|---|---|---|
| 1 | Periodic type | Quantity of routes | Average value |
| 2 | Periodic type and oscillation type | Quantity of lost packets, quantity of routes, and delay | Variance and median |
| ... | ... | ... | ... |

Figure 2:
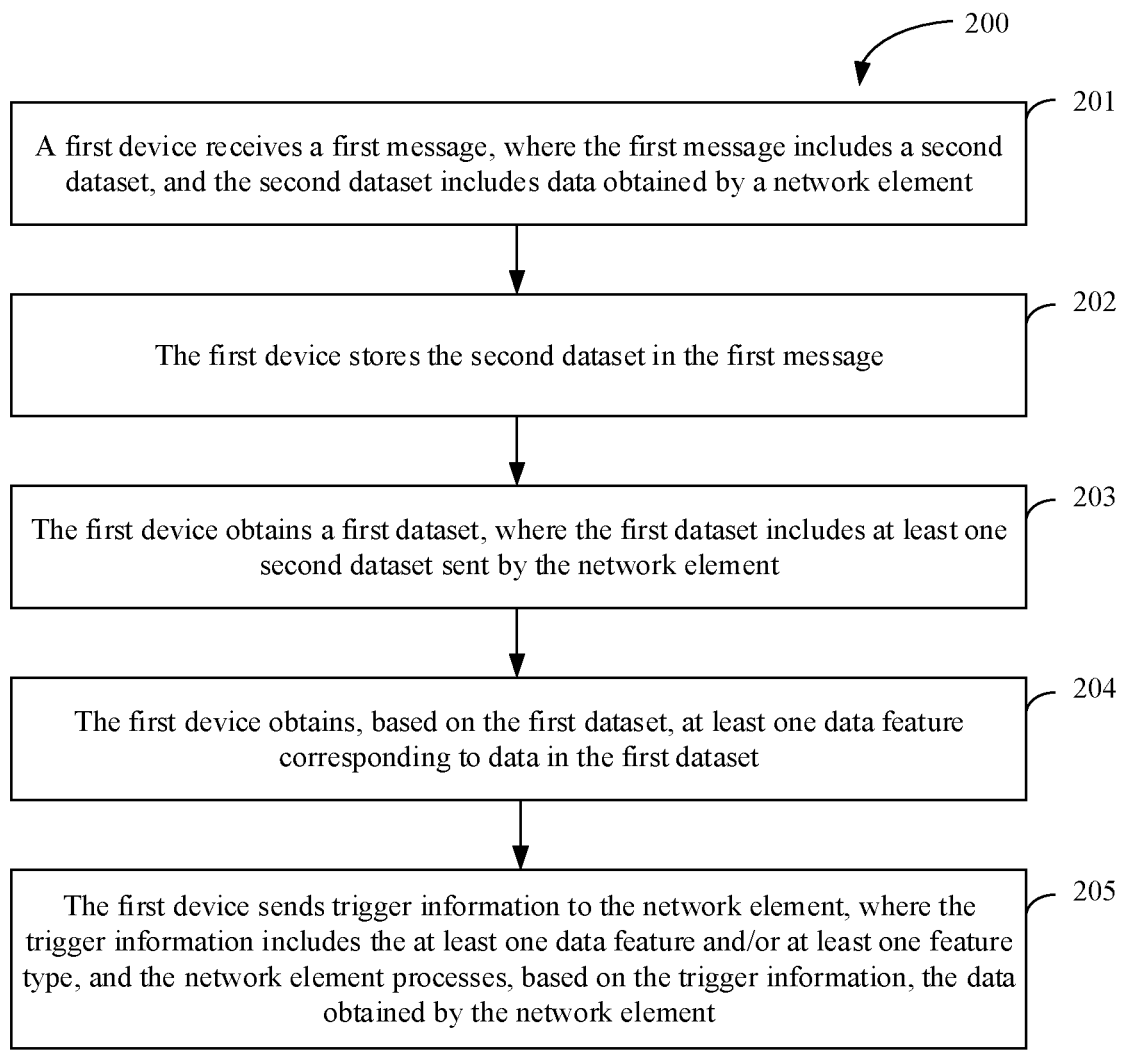
FIG. 2 is a flowchart of a data processing method according to an embodiment of this application.

As shown in FIG. 2, an embodiment of this application provides a data processing method 200. The method 200 may be applied to the network architecture shown in FIG. 1. The method 200 is performed by the first device 101 in the network architecture 100, and includes the following steps.

Step 201: The first device receives a first message, where the first message includes a second dataset, and the second dataset includes data obtained by a network element.

In the step 201, the first device periodically receives the first message sent by the network element, and the second dataset in the first message includes data obtained by the network element in one period.

In other words, the network element periodically sends the second dataset. The network element determines a first period, obtains a plurality of pieces of data in the first period to obtain the second dataset, and sends the first message including the second dataset to the first device. The second dataset includes the plurality of pieces of data obtained in the first period. When the first period ends, the network element further continues to determine a first period, and continues to obtain a plurality of pieces of data in the determined first period, so that the network element periodically sends the second dataset.

A manner in which the network element obtains data includes a data collection manner, a data receiving manner, and/or the like. For example, the network element collects a KPI in the data collection manner, that is, the second dataset includes the KPI collected by the network element; and/or the network element receives data from a network in the data receiving manner, that is, the second dataset includes data received by the network element. The data received by the network element may be service data, control information, and/or the like.

The second dataset includes at least one first data sequence. For each first data sequence, the first data sequence corresponds to at least one object and a data type, and at least one object is located in the network element. Data in the first data sequence is data that belongs to the data type and that is obtained by at least one object. In other words, the data in the second dataset is data obtained by at least one object in the network element, and the data in the second dataset belongs to at least one data type.

at least one object includes an interface, a collector, and/or a board on the network element.

The data type includes a KPI, service data, control information, and/or the like. The data in the second dataset belongs to a same data type, or belongs to different data types. The KPI is used as an example, that is, the data in the second dataset belongs to a same KPI, or belongs to a plurality of KPIs.

The KPI includes one or more of a quantity of routes, a quantity of lost packets, a quantity of routing entries, a quantity of bit errors, a delay, and the like.

For example, it is assumed that the data in the second dataset belongs to the same KPI, the KPI is the quantity of routes, and the data in the second dataset includes a quantity of routes obtained by the network element in one first period.

For another example, it is assumed that the data in the second dataset belongs to the plurality of KPIs, the plurality of KPIs include the quantity of routes, the quantity of lost packets, and the quantity of routing entries, and the data in the second dataset includes a quantity of routes, a quantity of lost packets, and a quantity of routing entries that are obtained by the network element in a first period.

For the first period, first period duration of the first period is configured by the network element based on a requirement, or is configured by the first device in the network element.

When the first period duration is configured by the first device, before the step 201 is performed, the first device generates task information, where the task information includes the first period duration, the first device sends the task information to the network element, and the network element receives the task information sent by the first device. In an example, after receiving the task information, the network element periodically obtains the second dataset based on the first period duration.

In some embodiments, the task information further includes at least one data type. In an example, the network element obtains data of each of at least one data type in the first period, to obtain the second dataset.

An operation of generating the task information by the first device is as follows.

The first device obtains the first period duration, generates the task information including the first period duration, and sends the task information to the network element.

In some embodiments, the first device further obtains at least one data type, and the task information generated further includes at least one data type.

In some embodiments, the first device further obtains a network element range, where the network element range includes a network element identifier of at least one network element. In an example, after generating the task information, the first device separately sends the task information to each network element based on a network element identifier of each network element included in the network element range, to trigger each network element in the network element range to obtain data.

For the foregoing first period duration, the first period duration is configured by technical personnel in the first device. During implementation, the first device displays a configuration interface, technical personnel inputs the first period duration in the configuration interface, and the first device obtains the first period duration from the configuration interface.

In some embodiments, technical personnel further inputs at least one data type in the configuration interface, and the first device further obtains at least one data type from the configuration interface.

In some embodiments, technical personnel further input a network element range in the configuration interface. The network element range includes a network element identifier of at least one network element. The first device further obtains the network element range from the configuration interface.

Figure 3:
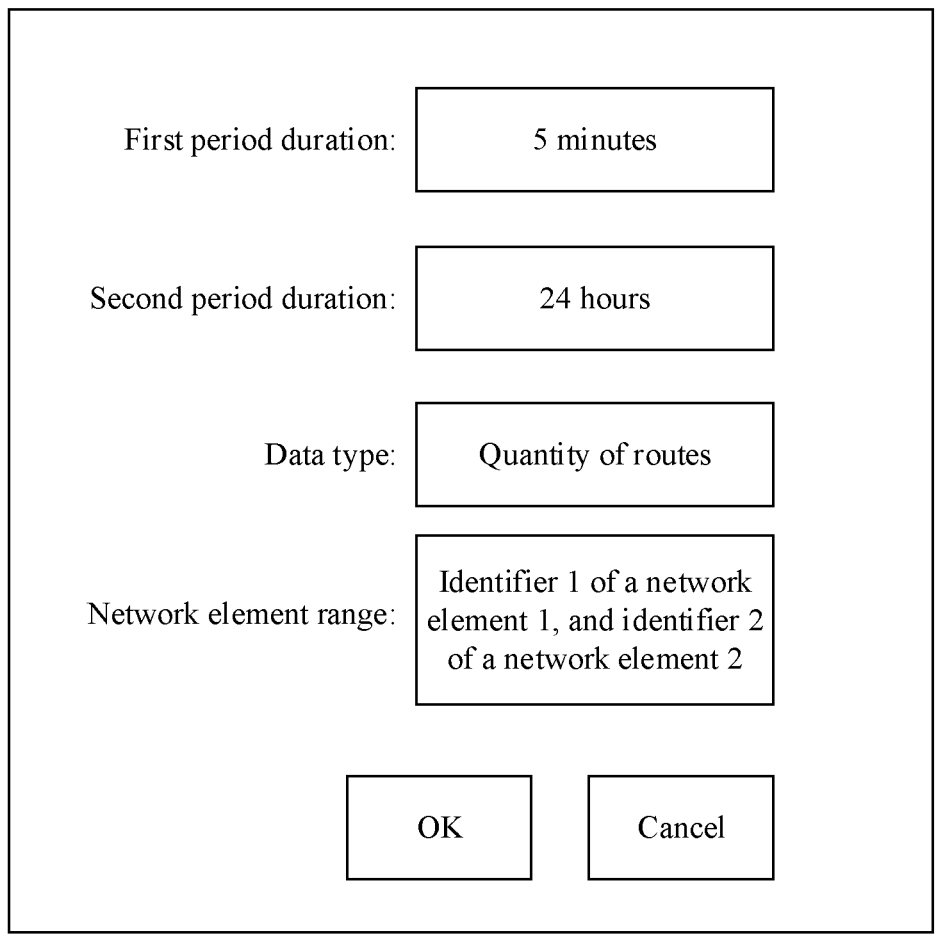
FIG. 3 is a schematic diagram of a structure of a configuration interface according to an embodiment of this application.

For example, as shown in FIG. 3, the first device displays a configuration interface. Technical personnel inputs, in the configuration interface, that first period duration is 5 minutes, an input data type is quantity of routes, and an input network element range includes a network element identifier of a network element 1 "ID-NE 1" and a network element identifier of a network element 2 "ID-NE 2", and then clicks an OK button in the configuration interface, so that the OK button generates a triggering command.

In an example, when the first device detects the triggering command from the OK button, the first period duration obtained from the configuration interface is 5 minutes, the obtained data type is the quantity of routes, and the obtained network element range includes the network element identifier of the network element 1 "ID-NE 1" and the network element identifier of the network element 2 "ID-NE 2". The first device generates task information, where the first period duration included in the task information is 5 minutes and the data type is "quantity of routes". The first device separately sends the task information to the network element 1 and the network element 2 based on the network element identifier of the network element 1 "ID-NE 1" and the network element identifier of the network element 2 "ID-NE 2", to trigger both the network element 1 and the network element 2 to obtain the quantity of routes, and obtain a second dataset including the quantity of routes every 5 minutes.

In some embodiments, the first message further includes attribute information corresponding to each first data sequence in the second dataset. For each first data sequence, the attribute information corresponding to the first data sequence includes obtaining time corresponding to each piece of data in the first data sequence, a data type corresponding to the first data sequence, and/or an object identifier of an object corresponding to the first data sequence.

The first message further includes network element information of the network element, and the network element information includes one or more of a network element identifier, a network element name, a network element address, a network element type, and the like of the network element.

In some embodiments, the network element sends the first message to the first device based on a network transmission protocol, and a format of the first message is a message format defined in the network transmission protocol.

The network transmission protocol includes a Network Configuration (Netconf) Protocol, a Secure File Transfer Protocol (SFTP), a Telemetry Protocol, or the like.

When the network transmission protocol is the Netconf protocol, the second dataset and/or the attribute information of the second dataset are/is encapsulated into the first message by using a data modeling language model such as Yet Another Next Generation (YANG) model.

Step 202: The first device stores the second dataset in the first message.

In the step 202, the first device obtains the network element information of the network element, obtains, based on the network element information and a second correspondence, a record including the network element information, and stores the second dataset in the obtained record. Each record in the second correspondence includes network element information of one network element and a first dataset corresponding to the network element, and the first dataset includes data that has been obtained by the network element.

The first data set in the record may include at least one second data sequence. For each second data sequence, the second data sequence corresponds to one object in the network element and a data type, and the second data sequence includes data that belongs to the data type and that has been obtained by the object.

The record may further include attribute information corresponding to each second data sequence. In an example, an operation of storing the second dataset into the obtained record by the first device is as follows. When the first message further includes the attribute information corresponding to each first data sequence in the second dataset, the first device stores each first data sequence into the obtained record based on the attribute information corresponding to each first data sequence.

In some embodiments, the first device further preprocesses the data in the second dataset. The preprocessing includes denoising processing, complement processing, splicing processing, and/or the like.

The denoising processing means that the first device removes noise from the data included in the second dataset. The noise may be generated in a process of transmitting the second dataset.

The complement processing means that the first device detects whether there is data loss in the second dataset, and if there is the data loss, supplements lost data in the second dataset. The data loss may be generated in a process of transmitting the second dataset.

When the data in the second dataset is periodically obtained by the network element, the first device performs complement processing on the second dataset. A process of the complement processing is as follows.

For each first data sequence in the second data set, the first device obtains, from the attribute information corresponding to the first data sequence, the obtaining time corresponding to each piece of data in the first data sequence, and determines, based on the obtaining time corresponding to each piece of data, obtaining time corresponding to lost data; the first device selects, based on the determined obtaining time, first data and second data from the first data sequence, where the first data is data most recently obtained before the lost data, and the second data is data most recently obtained after the lost data; and the first device supplements the lost data to the first data sequence based on the first data and the second data.

In some embodiments, the first device calculates an average value between the first data and the second data, and uses the average value obtained through calculation as the lost data. The first device calculates a variance between the first data and the second data, and uses the variance obtained through calculation as the lost data. Alternatively, the first device performs weighting calculation on the first data and the second data, and uses a value obtained through calculation as the lost data. For example, weighting calculation may be performed according to a weighting formula. The weighting formula is Data=Data 1*a+Data 2*b, where Data is the lost data, Data 1 is the first data, Data 2 is the second data, a and b are two specified weighted values, * is a multiplication operation, and a+b=1. Certainly, the first device may also obtain the lost data in other manners, which are not listed one by one herein.

The splicing processing means that the first device splices the second data sequence included in the obtained record and the first data sequence in the second data set into one data sequence, and updates the second data sequence included in the obtained record to a spliced data sequence, to store the second data set into the obtained record.

The first message may include the attribute information corresponding to each first data sequence in the second dataset. For each first data sequence in the second data set, the first device obtains the object identifier of the object and the data type from the attribute information corresponding to the first data sequence. The second data sequence that corresponds to the object and the data type is selected from the obtained record based on the object identifier of the object and the data type. The first data sequence and the second data sequence are spliced into one data sequence, and the second data sequence in the obtained record is updated to a spliced data sequence.

Step 203: The first device obtains the first dataset, where the first dataset includes at least one second dataset sent by the network element.

The first dataset includes a second dataset that is sent by the network element and that is received by the first device in a second period, and second period duration of the second period is greater than or equal to the first period duration.

In the step 203, the first device determines the second period, and obtains, from the second correspondence when the second period ends, the first dataset corresponding to the network element.

The first device further obtains, from the second correspondence, at least one data type corresponding to the first dataset and/or an object identifier of at least one object, where at least one data type includes a type to which data in the first dataset belongs, and at least one object is an object for obtaining the data in the first dataset.

In some embodiments, after obtaining, from the second correspondence, the first dataset corresponding to the network element, the first device further deletes, from the second correspondence, the record including the network element information of the network element. In an example, when receiving, in a next second period, a dataset sent by the network element, the first device re-creates, in the second correspondence based on the network element information of the network element and the received dataset, a record that includes the network element information of the network element and the received dataset, to ensure that data included in each dataset in the second correspondence is data obtained in one second period.

The second period duration is configured by the first device, and the first device configures the second period duration based on a requirement.

Alternatively, the second period duration is configured by technical personnel in the first device. For example, the first device displays the configuration interface shown in FIG. 3. Technical personnel inputs the second period duration in the configuration interface. For example, the second period duration is 24 hours, and the first device obtains the second period duration from the configuration interface.

Step 204: The first device obtains, based on the first dataset, at least one data feature corresponding to the data in the first dataset.

The first data set includes at least one second data sequence, and each of at least one second data sequence is processed to obtain a data feature corresponding to each second data sequence.

at least one data feature includes one or more pieces of the following information such as a data waveform feature corresponding to the data in the first dataset, a data content feature in the first dataset, and the object identifier of at least one object. At least one object includes an object for obtaining each piece of data in the first dataset.

For the data waveform feature, the following lists an example of obtaining the data waveform feature. The example is as follows.

For each second data sequence, a point corresponding to each piece of data is determined in a coordinate system based on each piece of data included in the second data sequence and obtaining time of each piece of data. A horizontal axis of the coordinate system is time, and a vertical axis is a data value. Points corresponding to each piece of data are connected in series in the coordinate system to obtain a data waveform corresponding to the second data sequence, the data waveform is processed by using a waveform processing model, and a data waveform feature corresponding to the second data sequence is output.

The data waveform feature includes one or more of a periodic type, an oscillation type, a horizontal type, a sudden change type, a trend type, and the like.

For the waveform processing model, a plurality of different data waveforms is obtained in advance, and a data waveform feature corresponding to each data waveform is marked, to obtain a plurality of training samples. Each training sample includes at least one data waveform and a data waveform feature corresponding to at least one data waveform. The waveform processing model is obtained by training an intelligent algorithm by using the plurality of training samples.

The intelligent algorithm includes a convolutional neural network, a random forest algorithm, a logistic regression algorithm, a support vector machine (SVM), or the like.

For the data content feature, the data content feature includes a service feature, a user feature, and/or the like.

In some embodiments, the service feature includes a service identifier, a quantity of times of accessing a service source, a quantity of service flows, and/or the like, and the user feature includes a quantity of times of requesting a service by a user, and the like.

In some embodiments, the first dataset may include service data and the like. The service data includes a service flow received by a network element and the like. The service flow includes a service identifier, 5-tuple information, a domain name of a service, a Uniform Resource Locator (URL), and/or the like. The domain name, a source address, and/or a URL of the service flow identify/identifies a network source of the service flow. The network source may also be referred to as a service source. Quantities of times of accessing the service source corresponding to different service flows are obtained by collecting statistics on source addresses, domain names, or URLs in the different service flows in the first dataset.

The 5-tuple information of the service flow may identify a service flow, and a quantity of service flows is obtained by collecting statistics on different 5-tuple information in the first dataset. A destination address of the service flow may be an address of a user requesting the service flow. For any destination address in the first dataset, the quantity of times of requesting a service by the user corresponding to the destination address is obtained by collecting statistics on the service flow including the destination address.

For the object identifier of at least one object, the first device obtains, from the second correspondence, the object identifier of the object corresponding to each of at least one second data sequence, that is, obtains the object identifier of at least one object.

In the step 204, the first device may further obtain at least one feature type based on at least one data feature and a first correspondence.

During implementation, the first device determines at least one record from the first correspondence, where a data feature included in at least one record is the same as at least one data feature; and the first device obtains the feature type included in at least one record.

In some embodiments, for a record stored in the first correspondence, the record may be configured by technical personnel, the record is generated by the first device, and/or the record is received by the first device and sent by another device. The another device includes a network element and/or a knowledge base.

In some embodiments, when the first device obtains at least one data feature and at least one feature type, the first device further queries whether a target record is stored in the first correspondence. The target record is a record including at least one data feature and at least one feature type. If the target record is not stored, the first device stores the target record in the first correspondence.

In some embodiments, the first device further obtains at least one data type, and obtains at least one feature type based on at least one data feature, the first correspondence, and at least one data type. At least one data type includes a type to which the data in the first dataset belongs.

During implementation, the first device determines at least one record from the first correspondence, where a data feature included in at least one record is the same as at least one data feature, and a data type included in at least one record is the same as at least one data type; and the first device obtains the feature type included in at least one record.

Step 205: The first device sends trigger information to the network element, where the trigger information includes at least one data feature and/or at least one feature type, and the network element processes, based on the trigger information, the data obtained by the network element.

In some embodiments, the trigger information further includes the foregoing obtained object identifier of at least one object and/or the foregoing obtained at least one data type.

The first device sends the trigger information to the network element by using a network transmission protocol, where a format of the trigger information is a message format defined by the network transmission protocol. The network transmission protocol includes Netconf, a Transmission Control Protocol (TCP), a User Datagram Protocol (UDP), or the like.

After receiving the trigger information, the network element processes the data obtained by the network element. A process in which the network element processes the data is as follows such as obtaining at least one feature type based on the trigger information, obtaining a data metric based on at least one feature type and the second dataset, and determining an abnormality of the data in the second dataset based on the data metric.

at least one feature type includes one or more of an average value, a variance, a median, a maximum value, a minimum value, and the like. In an example, the data metric obtained by the network element based on at least one feature type and the second dataset includes one or more of an average value of the data in the second dataset, a variance of the data in the second dataset, a median in the second dataset, a maximum value in the second dataset, a minimum value in the second dataset, and the like.

The network element includes a third correspondence, each record in the third correspondence includes at least one feature type and a data processing algorithm, and the data processing algorithm is used to obtain a data metric based on at least one feature type and the second dataset; and the network element determines the abnormality of the data in the second dataset based on the data metric.

In some embodiments, the data processing algorithm further includes at least one threshold, and the data processing algorithm compares the data metric with at least one threshold, and determines the abnormality of the data in the second dataset based on a comparison result.

In an example, a process in which the network element processes the data is specifically as follows.

The network element obtains at least one data processing algorithm based on at least one feature type and the third correspondence, determines an abnormality of the data metric based on at least one feature type and the second dataset by using at least one data processing algorithm, compares the data metric with a threshold in at least one data processing algorithm, and determines the abnormality of the data in the second dataset based on a comparison result.

For example, it is assumed that the third correspondence includes a correspondence between an average value and a data processing algorithm, and the data processing algorithm includes an average value threshold. The network element receives the trigger information, where at least one feature type in the trigger information includes the average value. The data processing algorithm is obtained based on the average value and the third correspondence. The data metric of the second dataset is obtained based on at least one feature type and the second dataset, where the data metric is the average value of the data in the second dataset. The data metric is compared with the average value threshold in the data processing algorithm. If a comparison result is that the data metric is greater than the average value threshold, it may be determined that the data metric is abnormal and the data in the second dataset is abnormal. If a comparison result is that the data metric is less than or equal to the average value threshold, it may be determined that the data metric is normal and the data in the second dataset is normal.

The second dataset may be obtained before the network element receives the trigger information. In this case, the first dataset may include the second dataset or partial data in the second dataset. Alternatively, the second dataset may be obtained after the network element receives the trigger information. In this case, the first dataset does not include the second dataset, and the second dataset is a dataset obtained by the network element after the first device obtains the first dataset.

In this embodiment of this application, the first device receives the second dataset sent by the network element and stores the second dataset. When receiving the second dataset in one second period, that is, when obtaining the first dataset, the first device processes the first dataset to obtain at least one data feature, and sends the trigger information to the network element. The trigger information includes at least one data feature and at least one feature type, and at least one feature type is obtained based on at least one data feature. In an example, the network element receives the trigger information, obtains at least one feature type based on the trigger information, determines the data metric based on at least one feature type and the second dataset, and analyzes the abnormality of the second dataset based on the data metric. Whenever the network element obtains a second dataset, the network element can send the second dataset to the first device, so that the network element does not need to store the second dataset for a long time. The first device processes the first dataset, so that the network element does not need to process the first dataset to obtain the data feature. In an example, this embodiment of this application is applicable to a network element with low computing performance and/or storage performance. In addition, at least one feature type is obtained based on the first dataset, and corresponds to data behavior in the first dataset. Even if the data collected by the network element changes due to a change of a network environment, it can be learned through analysis based on this embodiment of this application that the data behavior in the first dataset changes. At least one corresponding feature type is obtained by using at least one data feature of the data in the first dataset. The data metric obtained by the network element based on at least one feature type reflects a network status. In an example, this embodiment of this application reduces difficulty of analyzing the data in the second dataset, so that the abnormality of the second dataset can be accurately analyzed based on the data metric, to improve accuracy of analyzing the data.

Figure 4:
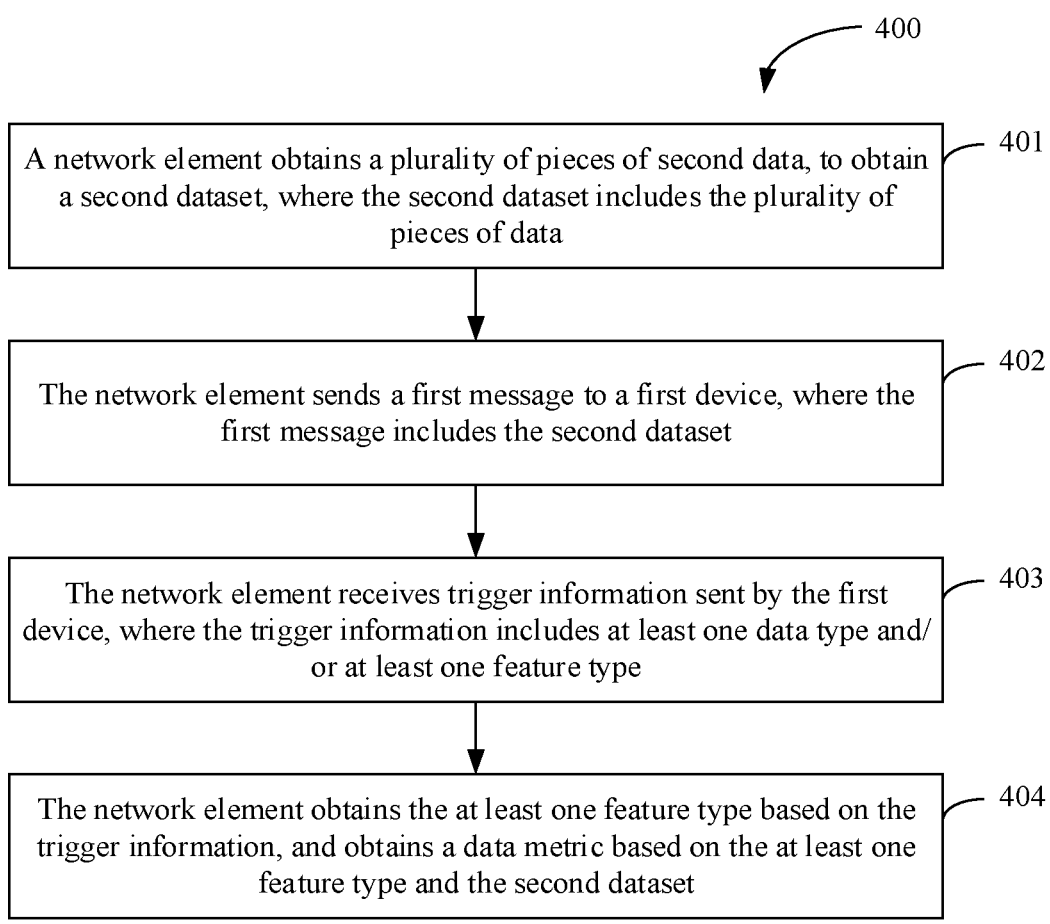
FIG. 4 is a flowchart of another data processing method according to an embodiment of this application.

As shown in FIG. 4, an embodiment of this application provides a data processing method 400. The method 400 may be applied to the network architecture 100 shown in FIG. 1. The method 400 is performed by the network element 102 in the network architecture 100, and includes the following steps.

Step 401: The network element obtains a plurality of pieces of second data, to obtain a second dataset, where the second dataset includes the plurality of pieces of second data.

In the step 401, the network element determines a first period, and obtains a plurality of pieces of second data in the first period, to obtain a second dataset, where the second dataset includes the plurality of pieces of second data obtained in the first period.

In the first period, a manner in which the network element obtains the data includes obtaining the data in real time, obtaining the data periodically, obtaining the data randomly, and/or the like. The second dataset includes at least one first data sequence, and each first data sequence includes data sorted by obtaining time. The data in each first data sequence may be data obtained by at least one object in the network element, and/or data of a same data type.

When the first period ends, the network element further continues to determine a first period, and continues to obtain a plurality of pieces of data in the determined first period, so that the network element periodically obtains the second dataset.

The network element includes at least one object, and each of at least one object obtains data in a first period. The network element obtains the data obtained by each object, to obtain the second dataset. In other words, the data included in the second dataset may be data obtained by a same object, or may be data obtained by a plurality of objects.

In some embodiments, the second dataset includes a first data sequence corresponding to each object, and the first data sequence corresponding to the object includes the data obtained by the object.

at least one object includes an interface, a collector, and/or a board on the network element.

In some embodiments, the data in the second dataset belongs to a same data type, or belongs to a plurality of data types.

In some embodiments, the foregoing data type is a KPI, service data, control information, and/or the like. The KPI is used as an example, that is, the data in the second dataset belongs to a same KPI, or belongs to a plurality of KPIs.

The KPI includes one or more of a quantity of routes, a quantity of lost packets, a quantity of routing entries, a quantity of bit errors, a delay, and the like.

In some embodiments, each object in the network element obtains data of at least one data type, the object corresponds to at least one first data sequence in the second dataset, each first data sequence corresponds to one data type, and data included in each first data sequence belongs to a same data type.

Based on the foregoing description, it can be learned that the second dataset includes at least one first data sequence, and each first data sequence corresponds to one object and one data type.

In the step 401, after obtaining the second dataset, the network element further analyzes an abnormality of the data in the second dataset, that is, analyzes whether the data in the second dataset is abnormal. A process in which the network element analyzes the second dataset in detail is described in detail in subsequent content, and is not specifically described herein.

For the first period, first period duration of the first period may be configured by the network element based on a requirement, or is configured by a first device in the network element.

When the first period duration is configured by the first device, before the step 401 is performed, the network element receives task information sent by the first device, where the task information includes the first period duration. After receiving the task information, the network element periodically obtains the second dataset based on the first period duration.

In some embodiments, the task information may further include at least one data type. In an example, the network element obtains data of each of at least one data type in the first period, to obtain the second dataset.

Step 402: The network element sends a first message to the first device, where the first message includes the second dataset.

In some embodiments, the first message further includes attribute information corresponding to each first data sequence in the second dataset. For each first data sequence, the attribute information corresponding to the first data sequence includes obtaining time corresponding to each piece of data in the first data sequence, a data type corresponding to the first data sequence, and/or an object identifier of an object corresponding to the first data sequence.

In some embodiments, the first message further includes network element information of the network element, and the network element information includes one or more of a network element identifier, a network element name, a network element address, a network element type, and the like of the network element.

In some embodiments, the network element sends the first message to the first device based on a network transmission protocol, and a format of the first message is a message format defined in the network transmission protocol.

The network transmission protocol includes a Netconf protocol, an SFTP, a Telemetry Protocol, or the like.

In some embodiments, when the network transmission protocol is the Netconf protocol, the second dataset and/or the attribute information of the second dataset are/is encapsulated into the first message by using a YANG model.

The network element repeats the operations in the foregoing steps 401 and 402, that is, the network element periodically sends the second dataset to the first device. The first device stores the received second dataset, and obtains a first dataset when receiving the second dataset for a period of time, where the first dataset includes at least one second dataset. The first device obtains at least one data feature and/or at least one feature type based on the first dataset, and sends trigger information to the network element. The trigger information includes at least one data feature and/or at least one feature type.

In some embodiments, the trigger information further includes at least one feature type and/or an object identifier of at least one object. At least one feature type includes a data type to which data in the first dataset belongs, and at least one object includes an object for obtaining the data in the first dataset.

For a detailed implementation process in which the first device obtains at least one data feature and/or at least one feature type based on the first dataset and sends the trigger information, refer to the content in the method 200 shown in FIG. 2. Details are not described herein again.

Step 403: The network element receives the trigger information sent by the first device, where the trigger information includes at least one data type and/or at least one feature type.

In some embodiments, the network element receives, by using a network transmission protocol, the trigger information sent by the first device, where a format of the trigger information is a message format defined by the network transmission protocol, and the network transmission protocol includes Netconf Protocol, TCP, UDP, or the like.

Step 404: The network element obtains at least one feature type based on the trigger information, and obtains a data metric based on at least one feature type and the second dataset.

When the trigger information includes at least one feature type, the network element reads at least one feature type from the trigger information.

When the trigger information includes at least one data feature, the network element obtains at least one feature type based on at least one data feature and a first correspondence. When the trigger information includes at least one data feature and at least one data type, the network element obtains at least one feature type based on at least one data feature, at least one data type, and a first correspondence.

at least one feature type includes one or more of an average value, a variance, a median, a maximum value, a minimum value, and the like. In an example, the data metric obtained based on at least one feature type and the second dataset includes one or more of an average value of the data in the second dataset, a variance of the data in the second dataset, a median in the second dataset, a maximum value in the second dataset, a minimum value in the second dataset, and the like.

After obtaining the data metric, the network element determines, based on the data metric, the abnormality of the data in the second dataset.

The network element includes a third correspondence, each record in the third correspondence includes at least one feature type and a data processing algorithm, and the data processing algorithm is used to obtain a data metric based on at least one feature type and the second dataset; and the network element determines the abnormality of the data in the second dataset based on the data metric.

In some embodiments, the data processing algorithm further includes at least one threshold, and the data processing algorithm compares the data metric with at least one threshold, and determines the abnormality of the data in the second dataset based on a comparison result.

In an example, in the step 404, the operation of obtaining the data metric by the network element is as follows.

The network element obtains at least one data processing algorithm based on at least one feature type and the third correspondence, determines an abnormality of the data metric based on at least one feature type and the second dataset by using at least one data processing algorithm, compares the data metric with a threshold in at least one data processing algorithm, and determines the abnormality of the data in the second dataset based on a comparison result.

For example, it is assumed that the third correspondence includes a correspondence between an average value and a data processing algorithm, and the data processing algorithm includes an average value threshold. The network element receives the trigger information, where at least one feature type in the trigger information includes the average value. The data processing algorithm is obtained based on the average value and the third correspondence. The data metric of the second dataset is obtained based on at least one feature type and the second dataset, where the data metric is the average value of the data in the second dataset. The data metric is compared with the average value threshold. If a comparison result is that the data metric is greater than the average value threshold, it may be determined that the data metric is abnormal and the data in the second dataset is abnormal. If a comparison result is that the data metric is less than or equal to the average value threshold, it is determined that the data metric is normal and the data in the second dataset is normal.

Each record in the third correspondence includes at least one feature type, at least one data type, and a data processing algorithm, and the record indicates that the data processing algorithm is used to process, based on at least one feature type, data belonging to at least one data type.

In an example, the operation of obtaining the data processing algorithm by the network element is as follows such as when the trigger information includes at least one data type, the network element obtains the data processing algorithm based on at least one data type, at least one feature type, and the third correspondence.

In some embodiments, the network element further sends the determined abnormality and/or the data metric to the first device.

The network element sends the abnormality to the first device when determining that the data in the second dataset is abnormal. The network element may send the abnormality to the first device in an event reporting manner.

The second dataset may be obtained before the network element receives the trigger information. In this case, the first dataset may include the second dataset or partial data in the second dataset. Alternatively, the second dataset may be obtained after the network element receives the trigger information. In this case, the first dataset does not include the second dataset, and the second dataset is a dataset obtained by the network element after the first device obtains the first dataset.

In some embodiments, when the trigger information further includes the object identifier of at least one object, the network element further obtains the second dataset based on the object identifier of at least one object, where the second dataset includes a plurality of pieces of data obtained by at least one object.

In some embodiments, if computing performance and/or storage performance of the network element are/is high, the network element may not need to send the second dataset to the first device, so that the first device obtains at least one data feature and/or at least one feature type. In this case, after obtaining the second dataset, the network element locally stores the second dataset, and obtains the first dataset after obtaining the second dataset for a period of time, where the first dataset includes at least one second dataset obtained within the period of time. The network element processes the data in the first dataset to obtain at least one data feature, and obtains at least one feature type based on at least one data feature.

In an example, the network element includes the first correspondence, and the network element obtains at least one feature type based on at least one data feature and the first correspondence. Alternatively, the network element obtains at least one data type, where at least one data type includes a data type to which the data in the first dataset belongs; and the network element obtains at least one feature type based on at least one data feature, at least one data type, and a first correspondence.

In this embodiment of this application, the network element obtains the plurality of pieces of data to obtain the second dataset including the plurality of pieces of data, and sends the second dataset to the first device. The network element periodically sends the second dataset to the first device, so that the first device processes the first dataset to obtain at least one data feature and/or at least one feature type, where the first dataset includes at least one second dataset sent by the network element. The network element receives the trigger information sent by the first device, where the trigger information includes at least one data feature and/or at least one feature type. The network element obtains at least one feature type based on the trigger information, determines the data metric based on at least one feature type and the second dataset, and analyzes an abnormality of the second dataset based on the data metric. Whenever the network element obtains a second dataset, the network element can send the second dataset to the first device, so that the network element does not need to store the second dataset for a long time. The first device processes the first dataset, so that the network element does not need to process the first dataset to obtain the data feature. In an example, this embodiment of this application is applicable to a network element with low computing performance and/or storage performance. In addition, at least one feature type is obtained based on the first dataset, and corresponds to data behavior in the first dataset. In an example, even if the data collected by the network element changes due to a change of a network environment, it can be learned through analysis based on this embodiment of this application that the data behavior in the first dataset changes. At least one corresponding feature type is obtained by using at least one data feature of the data in the first dataset. The data metric obtained by the network element based on at least one feature type and the second dataset cannot accurately reflect a network status, so that the network element can accurately analyze the abnormality of the second dataset based on the data metric, to improve accuracy of analyzing data. In addition, the network element may not need to send the second dataset to the first device. To be specific, the network element obtains the first dataset, processes the first dataset to obtain at least one data feature, and obtains at least one feature type based on at least one data feature. This can save network resources.

Figure 5:
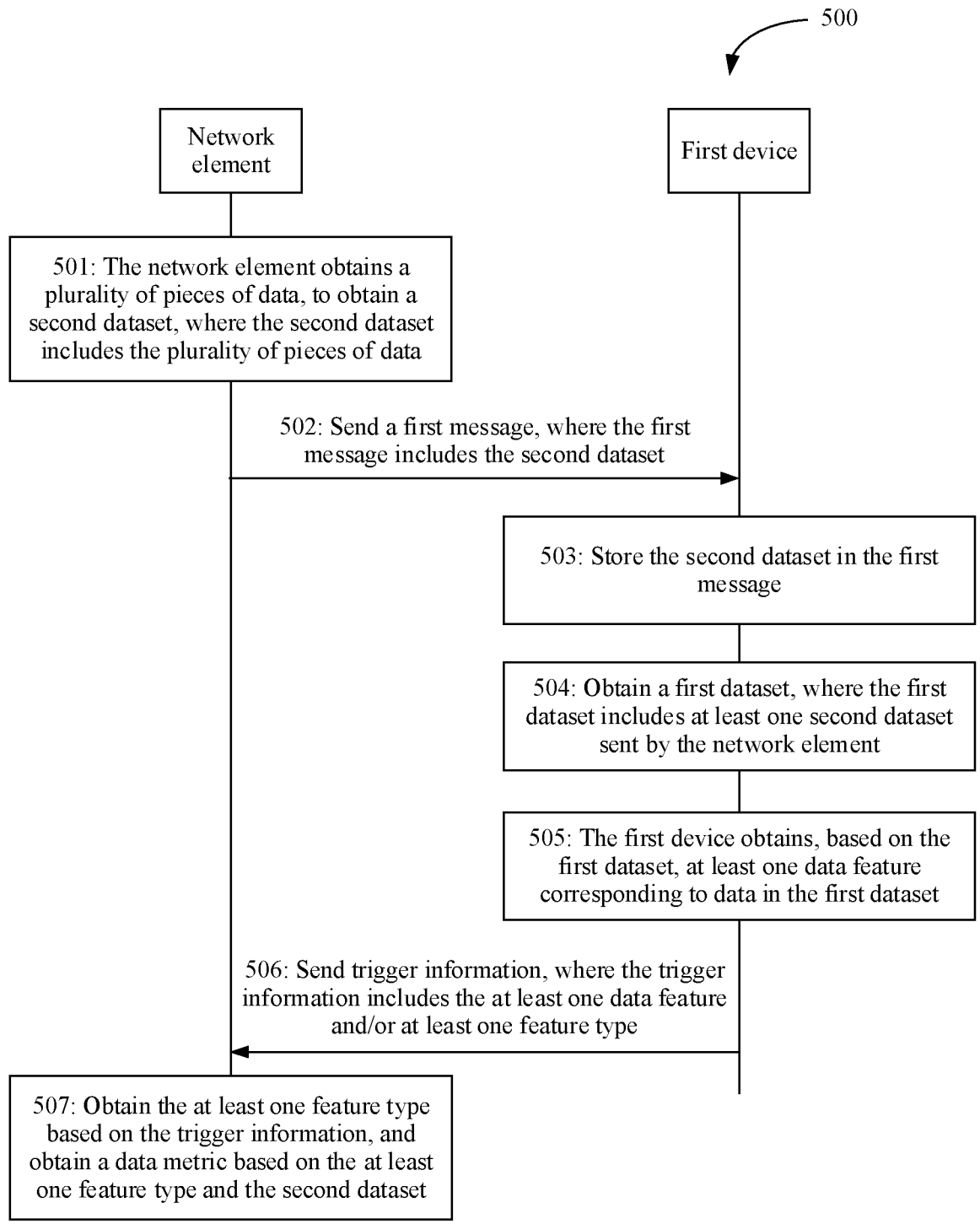
FIG. 5 is a flowchart of still another data processing method according to an embodiment of this application.

As shown in FIG. 5, an embodiment of this application provides a data processing method 500. The method 500 is applied to the network architecture 100 shown in FIG. 1. In the method 500, a first device receives data obtained by a network element, to obtain a first dataset, where the first dataset includes a plurality of pieces of data obtained by the network element; and the first device obtains at least one data feature or at least one feature type based on the first dataset. The first device sends trigger information to the network element, where the trigger information includes at least one data feature or at least one feature type, and the network element processes a second dataset based on the trigger information. The method 500 includes the following steps.

Step 501: The network element obtains a plurality of pieces of data, to obtain a second dataset, where the second dataset includes the plurality of pieces of data.

For a detailed implementation process in which the network element obtains the second dataset, refer to related content in the step 401 of the method 400 shown in FIG. 4. Details are not described herein again.

Step 502: The network element sends a first message to the first device, where the first message includes the second dataset.

For a detailed implementation process in which the network element sends the first message, refer to related content in the step 402 of the method 400 shown in FIG. 4. Details are not described herein again.

Step 503: The first device receives the first message, and stores the second dataset in the first message.

For a detailed implementation process in which the first device stores the second dataset in the first message, refer to related content in the step 202 of the method 200 shown in FIG. 2. Details are not described herein again.

Step 504: The first device obtains a first dataset, where the first dataset includes at least one second dataset sent by the network element.

For a detailed implementation process in which the first device obtains the first dataset, refer to related content in the step 203 of the method 200 shown in FIG. 2. Details are not described herein again.

Step 505: The first device obtains, based on the first dataset, at least one data feature corresponding to data in the first dataset.

For a detailed implementation process in which the first device obtains at least one data feature, refer to related content in the step 204 of the method 200 shown in FIG. 2. Details are not described herein again.

Step 506: The first device sends trigger information to the network element, where the trigger information includes at least one data feature and/or at least one feature type, and at least one feature type is obtained based on at least one data feature.

For a detailed implementation process in which the first device sends the trigger information, refer to related content in the step 205 of the method 200 shown in FIG. 2. Details are not described herein again.

Step 507: The network element receives the trigger information, obtains at least one feature type based on the trigger information, and obtains a data metric based on at least one feature type and the second dataset.

For a detailed implementation process in which the network element obtains at least one feature type and the data metric, refer to related content in the step 404 of the method 400 shown in FIG. 4. Details are not described herein again.

In this embodiment of this application, the first device receives the second dataset sent by the network element and stores the second dataset. When receiving a second dataset in one second period, that is, when obtaining the first dataset, the first device processes the first dataset to obtain at least one data feature, and sends the trigger information to the network element. The trigger information includes at least one data feature and at least one feature type. The network element obtains at least one feature type based on the trigger information, determines the data metric based on at least one feature type and the second dataset, and analyzes an abnormality of the second dataset based on the data metric. In addition, at least one feature type is obtained based on the first dataset, and corresponds to data behavior in the first dataset. In an example, even if the data collected by the network element changes due to a change of a network environment, it can be learned through analysis based on this embodiment of this application that the data behavior in the first dataset changes. At least one corresponding feature type is obtained by using at least one data feature of the data in the first dataset. The data metric obtained by the network element based on at least one feature type can accurately reflect a network status. In an example, this embodiment of this application reduces difficulty of analyzing data in the second dataset, so that the abnormality of the second dataset is accurately analyzed based on the data metric, to improve accuracy of analyzing the data.

Figure 6:
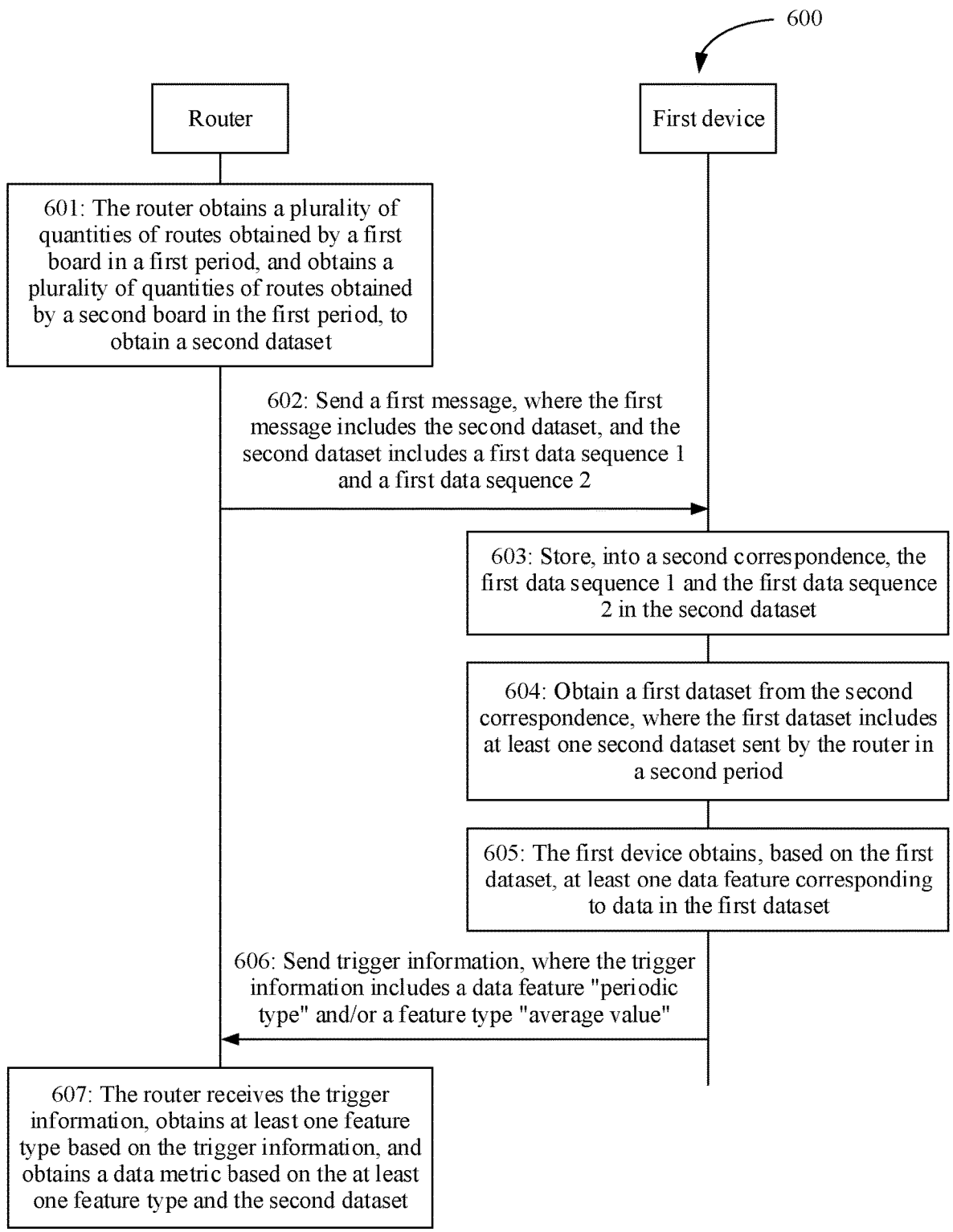
FIG. 6 is a flowchart of yet another data processing method according to an embodiment of this application.

For the method 500 shown in FIG. 5, an embodiment of this application provides a specific example to describe the method 500 in detail. In the example, a network element is a router. It is assumed that the router includes a first board and a second board, the first board is a first object of the router and is configured to obtain a quantity of routes, and the second board is a second object of the router and is also configured to obtain a quantity of routes. As shown in FIG. 6, the example includes the following steps.

Step 601: The router obtains a plurality of quantities of routes obtained by the first board in a first period, and obtains a plurality of quantities of routes obtained by the second board in the first period, to obtain a second dataset.

In the step 601, the second dataset includes two first data sequences such as a first data sequence 1 and a first data sequence 2. The first data sequence 1 corresponds to the first board, the first data sequence 1 includes the plurality of quantities of routes obtained by the first board, and the plurality of quantities of routes include 1, 3, 4, and 5. The first data sequence 2 corresponds to the second board, the first data sequence 2 includes the plurality of quantities of routes obtained by the second board, and the plurality of quantities of routes include 2, 3, 4, and 5.

Step 602: The router sends a first message to a first device, where the first message includes the second dataset, and the second dataset includes the first data sequence 1 and the first data sequence 2.

In some embodiments, the first message further includes attribute information 1 corresponding to the first data sequence 1 and attribute information 2 corresponding to the first data sequence 2. The attribute information 1 includes a data type corresponding to the first data sequence 1 and/or an object identifier of an object, the data type is "quantity of routes", and the object identifier of the object is an identifier "ID-ob 1" of the first board.

The attribute information 2 includes a data type corresponding to the first data sequence 2 and/or an object identifier of an object, the data type is also "quantity of routes", and the object identifier of the object is an identifier "ID-ob 2" of the second board.

Step 603: The first device receives the first message, and stores, into a second correspondence, the first data sequence 1 and the first data sequence 2 in the second dataset.

The first device locally stores the second correspondence. Each record in the second correspondence includes network element information of the network element and a first dataset, the first dataset includes data that has been sent by the network element, and the network element information includes an identifier, a name, an address, and/or a type of the network element.

The first data set in the record may include at least one second data sequence. For each second data sequence, the second data sequence corresponds to one object in the network element and a data type, and the second data sequence includes data that belongs to the data type and that has been obtained by the object. The record may further include attribute information corresponding to each second data sequence.

For example, refer to the second correspondence shown in the following table 3. A Pt record in the second correspondence includes an identifier of the router, the first dataset, and the attribute information. The identifier of the router is "ID-NE 1", the first dataset includes a second data sequence 1 and a second data sequence 2, the second data sequence 1 includes quantities of routes 1, 3, 4, and 5 that have been obtained by the first board in the router, and the second data sequence 2 includes quantities of routes 2, 3, 4, and 5 that have been obtained by the second board in the router. The attribute information includes attribute information 1 of the second data sequence 1 and attribute information 2 of the second data sequence 2. The attribute information 1 includes an object identifier and a data type, where the object identifier is the identifier "ID-ob 1" of the first board, and the data type is "quantity of routes". The attribute information 2 also includes an object identifier and a data type, where the object identifier is the identifier "ID-ob 2" of the second board, and the data type is "quantity of routes".

TABLE 3

| Sequence number | Network element information | Attribute information | | |
|---|---|---|---|---|
| | | First dataset | Object identifier | Data type |
| 1 | ID-NE 1 | 1, 3, 4, 5 | ID-ob 1 | Quantity of routes |
| | | 2, 3, 4, 5 | ID-ob 2 | Quantity of routes |
| ... | ... | ... | ... | ... |

In the step 603, the first device receives the first message sent by the router, the second dataset in the first message includes the first data sequence 1 (which includes data 1, 3, 4, and 5) and the second data sequence 2 (which includes data 2, 3, 4, and 5), and the first message further includes the attribute information 1 of the first data sequence 1 and the attribute information 2 of the first data sequence 2. The attribute information 1 includes the object identifier of the object and the data type that correspond to the first data sequence 1, where the object identifier is the identifier "ID-ob 1" of the first board, and the data type is "quantity of routes". The attribute information 2 includes the object identifier of the object and the data type that correspond to the first data sequence 2, where the object identifier is the identifier "ID-ob 2" of the second board, and the data type is "quantity of routes".

The first device obtains the identifier "ID-NE 1" of the router, and obtains, based on the "ID-NE 1", the $1^{st}$ record including the "ID-NE 1" from the second correspondence shown in the table 3. For the first data sequence 1 (which includes the data 1, 3, 4, and 5), the first device obtains the second data sequence 1 (which includes the data 1, 3, 4, and 5) from the $1^{st}$ record based on the identifier "ID-ob 1" of the first board and the "quantity of routes". The first data sequence 1 and the second data sequence 1 are spliced into one data sequence, and a spliced data sequence includes data 1, 3, 4, 5, 1, 3, 4, and 5. Refer to the following table 4. The second data sequence 1 in the $1^{st}$ record is updated to the spliced data sequence, so as to store the first data sequence 1 in the second correspondence.

For the first data sequence 2 (which includes the data 2, 3, 4, and 5), the first device obtains the second data sequence 2 (which includes the data 2, 3, 4, and 5) from the $1^{st}$ record based on the identifier "ID-ob 2" of the second board and the "quantity of routes". The first data sequence 2 and the second data sequence 2 are spliced into one data sequence, and a spliced data sequence includes data 2, 3, 4, 5, 2, 3, 4, and 5. Refer to the following table 4. The second data sequence 2 in the $1^{st}$ record is updated to the spliced data sequence, so as to store the first data sequence 2 in the second correspondence.

TABLE 4

| Sequence number | Network element information | Attribute information | | |
|---|---|---|---|---|
| | | First dataset | Object identifier | Data type |
| 1 | ID-NE 1 | 1, 3, 4, 5, 1, 3, 4, 5 | ID-ob 1 | Quantity of routes |

TABLE 4-continued

| Sequence number | Network element information | Attribute information | | |
|---|---|---|---|---|
| | | First dataset | Object identifier | Data type |
| | | 2, 3, 4, 5, 2, 3, 4, 5 | ID-ob 2 | Quantity of routes |
| ... | ... | ... | ... | ... |

Step 604: The first device obtains the first dataset from the second correspondence, where the first dataset includes at least one second dataset sent by the router in a second period.

The first device obtains, from the $1^{st}$ record in the second correspondence shown in the table 4, the first dataset corresponding to the router, where the first dataset includes the second data sequence 1 and the second data sequence 2, the second data sequence 1 includes the data 1, 3, 4, 5, 1, 3, 4, and 5, and the second data sequence 2 includes the data 2, 3, 4, 5, 2, 3, 4, and 5.

The first device further obtains an object identifier of at least one object and at least one data type from the $1^{st}$ record, where the object identifier of at least one object includes the identifier "ID-ob 1" of the first board and the identifier "ID-ob 2" of the second board, and at least one data type includes quantity of routes.

Step 605: The first device obtains, based on the first dataset, at least one data feature corresponding to data in the first dataset.

The first data set includes the second data sequence 1 and the second data sequence 2, the second data sequence 1 includes the data 1, 3, 4, 5, 1, 3, 4, and 5, and the second data sequence 2 includes the data 2, 3, 4, 5, 2, 3, 4, and 5. The data 1, 3, 4, 5, 1, 3, 4, and 5 included in the second data sequence 1 is processed, and an obtained data waveform feature is a periodic type. The data 2, 3, 4, 5, 2, 3, 4, and 5 included in the second data sequence 2 is processed, and an obtained data waveform feature is a periodic type. In an example, at least one data feature obtained by processing the first dataset includes a periodic type.

In some embodiments, the first device further obtains at least one feature type based on the periodic type, the data type "quantity of routes" to which the first dataset belongs, and the first correspondence shown in the table 2. At least one feature type includes an average value.

Step 606: The first device sends trigger information to the router, where the trigger information includes a data feature "periodic type" and/or a feature type "average value".

In some embodiments, the trigger information further includes the identifier "ID-ob 1" of the first board, the identifier "ID-ob 2" of the second board, and/or the "quantity of routes".

Step 607: The router receives the trigger information, obtains at least one feature type based on the trigger information, and obtains a data metric based on at least one feature type and the second dataset.

The router stores a third correspondence, and the third correspondence includes a correspondence between an average value and a data processing algorithm. The data processing algorithm includes an average value threshold.

In the step 607, the router receives the trigger information, and obtains at least one feature type based on the trigger information, and at least one feature type includes an average value. The data processing algorithm is obtained based on the average value and the third correspondence. The data metric is obtained based on at least one feature type and the second dataset, where the data metric is an average value of quantities of routes in the second dataset. The average value of the quantities of routes is compared with the average value threshold. If a comparison result is that the average value of the quantities of routes is greater than the average value threshold, it is determined that the average value of the quantities of routes is abnormal and the quantity of routes in the second dataset is abnormal. If a comparison result is that the average value of the quantities of routes is less than or equal to the average value threshold, it is determined that the average value of the quantities of routes is normal and the quantity of routes in the second dataset is normal.

In this embodiment of this application, the first device receives the second dataset sent by the router and stores the second dataset. When receiving the second dataset for a period of time, that is, when obtaining the first dataset, the first device processes the first dataset to obtain at least one data feature, and sends the trigger information to the router. The trigger information includes at least one data feature and at least one feature type. The router obtains at least one feature type based on the trigger information, determines the data metric based on at least one feature type and the second dataset, and analyzes an abnormality of the second dataset based on the data metric. In addition, at least one feature type is obtained based on the first dataset, and corresponds to data behavior in the first dataset. In an example, even if data collected by the router changes due to a change of a network environment, it can be learned through analysis based on this embodiment of this application that the data behavior in the first dataset changes. At least one corresponding feature type is obtained by using at least one data feature of the data in the first dataset. The data metric obtained by the router based on at least one feature type can accurately reflect a network status. In an example, this embodiment of this application reduces difficulty of analyzing data in the second dataset, so that the abnormality of the second dataset is accurately analyzed based on the data metric, to improve accuracy of analyzing the data.

Figure 7:
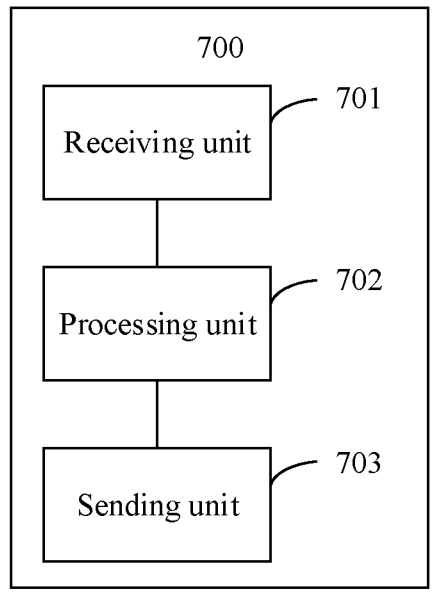
FIG. 7 is a schematic diagram of a structure of a data processing apparatus according to an embodiment of this application.

As shown in FIG. 7, an embodiment of this application provides a data processing apparatus 700. The apparatus 700 may be deployed on the first device provided in any one of the foregoing embodiments, for example, deployed on the first device 101 in the network architecture 100 shown in FIG. 1, the first device in the method 200 shown in FIG. 2, the first device in the method 500 shown in FIG. 5, or the first device in the method 600 shown in FIG. 6. The apparatus 700 includes a receiving unit 701, configured to receive a first dataset sent by a network element, where the first dataset includes a plurality of pieces of first data obtained by the network element; a processing unit 702, configured to obtain, based on the first dataset, at least one data feature corresponding to the plurality of pieces of first data; and a sending unit 703, configured to send trigger information to the network element, where the trigger information includes at least one data feature and/or at least one feature type, and at least one feature type is related to at least one data feature.

In some embodiments, the network element receives the trigger information, obtains at least one feature type based on the trigger information, and obtains a data metric based on at least one feature type and a second dataset, where the second dataset includes a plurality of pieces of second data obtained by the network element.

In some embodiments, for a detailed implementation process in which the receiving unit 701 receives the first dataset, refer to related content in the steps 201 to 203 of the method 200 shown in FIG. 2, the steps 503 and 504 of the method 500 shown in FIG. 5, and the steps 603 and 604 of the method 600 shown in FIG. 6. Details are not described herein again.

For a detailed implementation process in which the processing unit 702 obtains at least one data feature, refer to related content in the step 204 of the method 200 shown in FIG. 2, the step 505 of the method 500 shown in FIG. 5, and the step 605 of the method 600 shown in FIG. 6. Details are not described herein again.

In some embodiments, the processing unit 702 is further configured to obtain at least one feature type based on at least one data feature and a first correspondence, where the first correspondence includes at least one data feature and at least one feature type.

In some embodiments, the processing unit 702 is configured to obtain at least one feature type based on at least one data feature, the first correspondence, and at least one data type, where at least one data type includes a type to which the first data in the first dataset belongs, and the first correspondence includes at least one data feature, at least one data type, and/or at least one feature type.

In some embodiments, for a detailed implementation process in which the processing unit 702 obtains at least one feature type, refer to related content in the step 204 of the method 200 shown in FIG. 2, the step 505 of the method 500 shown in FIG. 5, and the step 605 of the method 600 shown in FIG. 6. Details are not described herein again.

In some embodiments, the trigger information includes at least one data feature and/or at least one data type, and at least one data type includes a type to which the first data in the first dataset belongs.

In a first embodiment, the network element obtains at least one feature type based on at least one data feature and/or at least one data type.

In some embodiments, the trigger information further includes an object identifier of at least one first object, and at least one first object is located in the network element.

In some embodiments, the network element obtains the second dataset based on the object identifier of at least one first object, where the second dataset includes second data obtained by at least one first object.

In some embodiments, for a detailed description of the trigger information, refer to related content in the step 205 of the method 200 shown in FIG. 2, the step 403 of the method 400 shown in FIG. 4, the step 506 of the method 500 shown in FIG. 5, and the step 606 of the method 600 shown in FIG. 6. Details are not described herein again.

In some embodiments, at least one data feature includes one or more pieces of the following information such as a data waveform feature corresponding to the first data in the first dataset, a data content feature in the first dataset, and an object identifier of at least one second object, where at least one second object includes an object for obtaining each piece of first data in the first dataset.

In some embodiments, the apparatus 700 includes a data processing system, a controller, or a management device.

In some embodiments, the first dataset includes the second dataset or partial data in the second dataset, or the second dataset includes data obtained after the network element sends the first dataset.

In this embodiment of this application, the first dataset received by the receiving unit includes the plurality of pieces of first data obtained by the network element. The processing unit obtains, based on the first dataset, at least one data feature corresponding to the plurality of pieces of first data, and at least one data feature corresponds to data behavior of the first data in the first dataset. The sending unit sends the trigger information to the network element, and the trigger information includes at least one data feature and/or at least one feature type. In an example, the network element obtains at least one feature type based on the trigger information. At least one data feature corresponds to the data behavior of the first data in the first dataset, and at least one feature type is obtained based on at least one data feature. Even if the data collected by the network element changes due to a change of a network environment, it can be learned through analysis based on this embodiment of this application that the data behavior in the first dataset changes. At least one corresponding feature type is obtained by using at least one data feature of the data in the first dataset. The data metric obtained by the network element based on at least one feature type and the second dataset can accurately reflect a network status. In an example, according to this embodiment of this application, the network element reduces difficulty of analyzing the data in the second dataset, can improve accuracy of the obtained data metric, and improves accuracy of analyzing the data in the second dataset.

Figure 8:
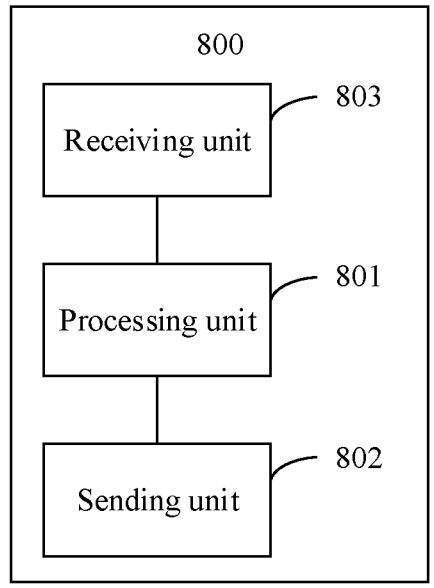
FIG. 8 is a schematic diagram of a structure of another data processing apparatus according to an embodiment of this application.

As shown in FIG. 8, an embodiment of this application provides a data processing apparatus 800. The apparatus 800 may be deployed on the network element provided in any one of the foregoing embodiments, for example, deployed on the network element 102 in the network architecture 100 shown in FIG. 1, the network element in the method 400 shown in FIG. 4, the network element in the method 500 shown in FIG. 5, or the router in the method 600 shown in FIG. 6. The apparatus 800 includes a processing unit 801, configured to obtain a first dataset, where the first dataset includes a plurality of pieces of obtained first data.

The processing unit 801 is further configured to obtain at least one feature type based on the first dataset, where at least one feature type corresponds to at least one data feature corresponding to the plurality of pieces of first data.

The processing unit 801 is further configured to obtain a data metric based on at least one feature type and a second dataset, where the second dataset includes a plurality of pieces of obtained second data.

In some embodiments, for a detailed implementation process in which the processing unit 801 obtains at least one feature type and the data metric, refer to related content in the step 404 of the method 400 shown in FIG. 4, the step 507 of the method 500 shown in FIG. 5, and the step 607 of the method 600 shown in FIG. 6. Details are not described herein again.

In some embodiments, the apparatus 800 further includes a sending unit 802 and a receiving unit 803.

The sending unit 802 is configured to send the first dataset, where the first dataset is used by a receiver of the first dataset to obtain at least one data feature and/or at least one feature type.

The receiving unit 803 is configured to receive trigger information, where the trigger information includes at least one data feature and/or at least one feature type.

The processing unit 801 is configured to obtain at least one feature type based on the trigger information.

In some embodiments, for a detailed implementation process in which the sending unit 802 sends the first dataset, refer to related content in the step 402 of the method 400 shown in FIG. 4, the step 502 of the method 500 shown in FIG. 5, and the step 602 of the method 600 shown in FIG. 6. Details are not described herein again.

In some embodiments, for a detailed implementation process in which the receiving unit 803 receives the trigger information, refer to related content in the step 403 of the method 400 shown in FIG. 4, the step 507 of the method 500 shown in FIG. 5, and the step 607 of the method 600 shown in FIG. 6. Details are not described herein again.

In some embodiments, the trigger information includes at least one data feature, and the processing unit 801 is configured to obtain at least one feature type based on at least one data feature and a first correspondence, where the first correspondence includes at least one data feature and at least one feature type.

In some embodiments, the trigger information further includes at least one data type, and at least one data type includes a type to which the first data in the first dataset belongs; and the processing unit 801 is configured to obtain at least one feature type based on at least one data feature, at least one data type, and the first correspondence, where the first correspondence includes at least one data feature, at least one data type, and at least one feature type.

In some embodiments, for a detailed implementation process in which the processing unit 801 obtains at least one feature type based on at least one data type, refer to related content in the step 404 of the method 400 shown in FIG. 4, the step 507 of the method 500 shown in FIG. 5, and the step 607 of the method 600 shown in FIG. 6. Details are not described herein again.

In some embodiments, the trigger information further includes an object identifier of at least one first object; and the processing unit 801 is further configured to obtain the second dataset based on the object identifier of at least one first object, where the second dataset includes a plurality of pieces of second data obtained by at least one first object.

In some embodiments, for a detailed description of the trigger information, refer to related content in the step 205 of the method 200 shown in FIG. 2, the step 403 of the method 400 shown in FIG. 4, the step 506 of the method 500 shown in FIG. 5, and the step 606 of the method 600 shown in FIG. 6. Details are not described herein again.

In some embodiments, the processing unit 801 is configured to obtain at least one data feature based on the first dataset; and obtain at least one feature type based on at least one data feature and a first correspondence, where the first correspondence includes at least one data feature and at least one feature type.

In some embodiments, at least one data feature includes one or more pieces of the following information such as a data waveform feature corresponding to the first data in the first dataset, a data content feature in the first dataset, and an object identifier of at least one second object, where at least one second object includes an object for obtaining the first data in the first dataset.

In some embodiments, the processing unit 801 is further configured to determine an abnormality of the second data in the second dataset based on the data metric; and send the determined abnormality and/or the data metric.

In some embodiments, for a detailed implementation process in which the processing unit 801 determines the abnormality, refer to related content in the step 404 of the method 400 shown in FIG. 4, the step 507 of the method 500 shown in FIG. 5, and the step 607 of the method 600 shown in FIG. 6. Details are not described herein again.

In some embodiments, the first dataset includes the second dataset or partial data in the second dataset, or the second dataset includes data obtained after the network element obtains the first dataset.

In this embodiment of this application, the processing unit obtains the first dataset, and the first dataset includes the plurality of pieces of obtained first data. The processing unit obtains at least one feature type based on the first dataset, and at least one feature type corresponds to at least one data feature corresponding to the plurality of pieces of data. At least one data feature corresponds to data behavior of the first data in the first dataset, at least one feature type corresponds to at least one data feature, and at least one feature type is obtained based on at least one data feature. Even if data collected by the apparatus changes due to a change of a network environment, the processing unit can learn, through analysis, that the data behavior in the first dataset changes. A corresponding feature type is obtained by using at least one data feature of the data in the first dataset. The data metric obtained by the processing unit based on at least one feature type and the second dataset can accurately reflect a network status. In an example, according to this embodiment of this application, the processing unit reduces difficulty of analyzing the data in the second dataset, and improves accuracy of analyzing the data in the second dataset.

Figure 9:
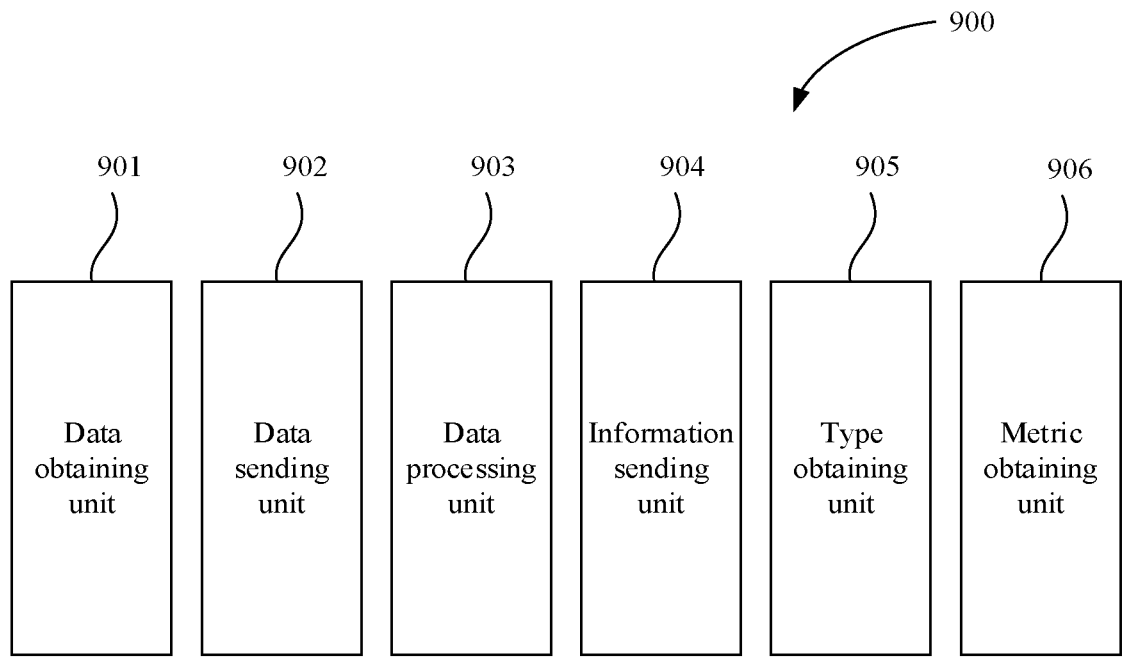
FIG. 9 is a schematic diagram of a structure of a data processing system according to an embodiment of this application.

As shown in FIG. 9, this application provides a data processing system 900. The system 900 includes a data obtaining unit 901, configured to obtain a first dataset, where the first dataset includes a plurality of pieces of first data; a data sending unit 902, configured to send the first dataset; a data processing unit 903, configured to obtain, based on the first dataset, at least one data feature corresponding to the plurality of pieces of first data; an information sending unit 904, configured to send trigger information, where the trigger information includes at least one data feature and/or at least one feature type, and at least one feature type is obtained by the data processing unit 903 based on at least one data feature; a type obtaining unit 905, configured to obtain at least one feature type based on the trigger information; and a metric obtaining unit 906, configured to obtain a data metric based on at least one feature type and a second dataset, where the second dataset includes a plurality of pieces of second data.

The plurality of pieces of second data included in the second dataset is obtained by the data obtaining unit 901 or obtained by the metric obtaining unit 906.

In some embodiments, some or all of the data obtaining unit 901, the data sending unit 902, the data processing unit 903, the information sending unit 904, the type obtaining unit 905, and the metric obtaining unit 906 are deployed on a first device and/or a network element. For example, the data obtaining unit 901, the data sending unit 902, the type obtaining unit 905, and the metric obtaining unit 906 are deployed on the network element, and the data processing unit 903 and the information sending unit 904 are deployed on the first device. Alternatively, the data obtaining unit 901, the data sending unit 902, the data processing unit 903, the information sending unit 904, the type obtaining unit 905, and/or the metric obtaining unit 906 are deployed on the network element. Alternatively, the data obtaining unit 901, the data sending unit 902, the data processing unit 903, the information sending unit 904, the type obtaining unit 905, and/or the metric obtaining unit 906 are deployed on the first device.

In some embodiments, the first device may be the first device provided in any one of the foregoing embodiments, for example, may be the first device 101 in the network architecture 100 shown in FIG. 1, the first device in the method 200 shown in FIG. 2, the first device in the method 500 shown in FIG. 5, the first device in the method 600 shown in FIG. 6, or the apparatus 700 shown in FIG. 7.

In some embodiments, the network element may be the network element provided in any one of the foregoing embodiments, for example, may be the network element 102 in the network architecture 100 shown in FIG. 1, the network element in the method 400 shown in FIG. 4, the network element in the method 500 shown in FIG. 5, the router in the method 600 shown in FIG. 6, or the apparatus 800 shown in FIG. 8.

In some embodiments, for a detailed implementation process in which the data obtaining unit 901 obtains the first dataset, refer to related content in the steps 201 to 203 of the method 200 shown in FIG. 2, the step 401 of the method 400 shown in FIG. 4, the step 501 or the step 504 of the method 500 shown in FIG. 5, and the step 601 or the step 604 of the method 600 shown in FIG. 6. Details are not described herein again.

In some embodiments, for a detailed implementation process in which the data processing unit 903 obtains at least one data feature, refer to related content in the step 204 of the method 200 shown in FIG. 2, the step 404 of the method 400 shown in FIG. 4, the step 505 or the step 507 of the method 500 shown in FIG. 5, and the step 605 or the step 607 of the method 600 shown in FIG. 6. Details are not described herein again.

In some embodiments, for a detailed implementation process in which the type obtaining unit 905 obtains at least one feature type, refer to related content in the step 204 of the method 200 shown in FIG. 2, the step 404 of the method 400 shown in FIG. 4, the step 505 or the step 507 of the method 500 shown in FIG. 5, and the step 605 or the step 607 of the method 600 shown in FIG. 6. Details are not described herein again.

In some embodiments, for a detailed implementation process in which the metric obtaining unit 906 obtains the data metric, refer to related content in the step 404 of the method 400 shown in FIG. 4, the step 507 of the method 500 shown in FIG. 5, and the step 607 of the method 600 shown in FIG. 6. Details are not described herein again.

In some embodiments, the data processing unit 903 is further configured to obtain at least one feature type based on at least one data feature and a first correspondence, where the first correspondence includes at least one data feature and at least one feature type.

In some embodiments, the data processing unit 903 is configured to obtain at least one feature type based on at least one data feature, the first correspondence, and at least one data type, where at least one data type includes a type to which the first data in the first dataset belongs, and the first correspondence includes at least one data feature, at least one data type, and at least one feature type.

In some embodiments, the trigger information includes at least one data feature, and the type obtaining unit 905 is configured to obtain at least one feature type based on at least one data feature and a first correspondence, where the first correspondence includes at least one data feature and at least one feature type.

In some embodiments, the trigger information further includes at least one data type, and at least one data type includes a type to which the first data in the first dataset belongs; and the type obtaining unit 905 is configured to obtain at least one feature type based on at least one data feature, at least one data type, and the first correspondence, where the first correspondence includes at least one data feature, at least one data type, and at least one feature type.

In some embodiments, for a detailed description of the trigger information, refer to related content in the step 205 of the method 200 shown in FIG. 2, the step 403 of the method 400 shown in FIG. 4, the step 506 of the method 500 shown in FIG. 5, and the step 606 of the method 600 shown in FIG. 6. Details are not described herein again.

In some embodiments, the trigger information further includes an object identifier of at least one first object, and the second dataset includes a plurality of pieces of second data obtained by at least one first object.

In some embodiments, at least one data feature includes one or more pieces of the following information such as a data waveform feature corresponding to the first data in the first dataset, a data content feature in the first dataset, and an object identifier of at least one second object, where at least one second object includes an object for obtaining the first data in the first dataset.

In some embodiments, the metric obtaining unit 906 is further configured to determine an abnormality of the second data in the second dataset based on the data metric; and the data sending unit 902 is further configured to send the determined abnormality and/or the data metric.

In some embodiments, for a detailed implementation process in which the metric obtaining unit 906 determines the abnormality, refer to related content in the step 404 of the method 400 shown in FIG. 4, the step 507 of the method 500 shown in FIG. 5, and the step 607 of the method 600 shown in FIG. 6. Details are not described herein again.

In some embodiments, the first dataset includes the second dataset or partial data in the second dataset, or the second dataset includes data obtained after the first dataset is obtained.

In this embodiment of this application, the data obtaining unit obtains the first dataset, and the first dataset includes the plurality of pieces of obtained first data. The data processing unit obtains, based on the first dataset, at least one data feature corresponding to the plurality of pieces of first data, at least one data feature corresponds to data behavior of the first data in the first dataset, and at least one feature type is obtained by the data processing unit based on at least one data feature. Even if obtained data changes due to a change of a network environment, it can be learned through analysis based on the foregoing system that the data behavior in the first dataset changes. The type obtaining unit obtains a corresponding feature type by using at least one data feature of the data in the first dataset. In an example, the data metric obtained by the metric obtaining unit based on at least one feature type and the second dataset can accurately reflect a network status. According to the foregoing system, the metric obtaining unit reduces difficulty of analyzing the data in the second dataset, and improves accuracy of analyzing the data in the second dataset.

In some embodiments, the modules in the data processing system 900 may be deployed in a same physical device. In some other embodiments, the modules in the data processing system 900 may be deployed in a plurality of different physical devices. Each module in the data processing system 900 may be a hardware module or a module combining software and hardware.

Figure 10:
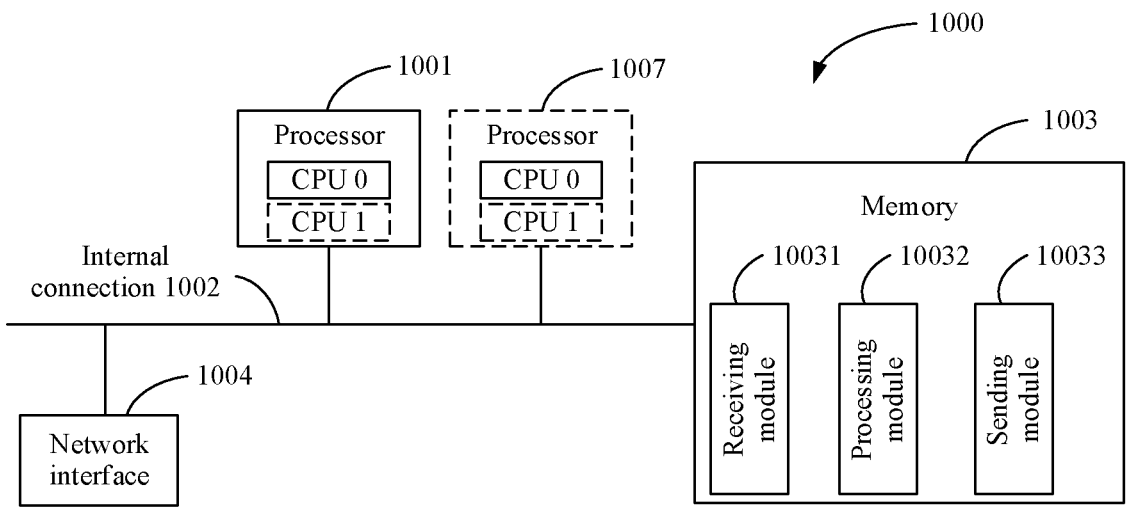
FIG. 10 is a schematic diagram of a structure of a data processing device according to an embodiment of this application.

FIG. 10 is a schematic diagram of a data processing device 1000 according to an embodiment of this application. The device 1000 may be the first device provided in any one of the foregoing embodiments, for example, may be the first device 101 in the network architecture shown in FIG. 1, the first device in the method 200 shown in FIG. 2, the first device in the method 500 shown in FIG. 5, or the first device in the method 600 shown in FIG. 6. The device 1000 includes at least one processor 1001, an internal connection 1002, a memory 1003, and at least one network interface 1004.

The device 1000 is an apparatus of a hardware structure.

In some embodiments, the device 1000 may be configured to implement the functional modules in the apparatus 700 shown in FIG. 7. For example, a person skilled in the art may figure out that the processing unit 702 in the apparatus 700 shown in FIG. 7 may be implemented by using at least one processor 1001 by invoking code in the memory 1003, and the receiving unit 701 and the sending unit 703 in the apparatus 700 shown in FIG. 7 may be implemented by using at least one network interface 1004.

In some embodiments, the memory 1003 is configured to store a program module and data. The program module includes a receiving module 10031, a processing module 10032, and a sending module 10033. In some embodiments, the modules in the memory 1003 in FIG. 10 respectively correspond to the modules shown in FIG. 7. The processor 1001 can perform, by executing computer-readable instructions in each module in the memory 1003, an operation that can be performed by each module shown in FIG. 7.

The device 1000 may be further configured to implement a function of the first device in any one of the foregoing embodiments.

The processor 1001 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this application. For example, the processor 1101 includes an application-specific integrated circuit (ASIC), a programmable logic device (PLD) or another programmable logic device, a transistor logic device, a hardware component, or any combination thereof. The PLD may be, for example, a complex programmable logic device (CPLD), a field-programmable gate array (FPGA), a generic array logic (GAL), or any combination thereof. The processor may implement or execute various logical blocks, modules, and circuits described with reference to content disclosed in embodiments of this application. Alternatively, the processor may be a combination of processors implementing a computing function, for example, a combination of one or more microprocessors, or a combination of a DSP and a microprocessor.

The internal connection 1002 may include a path for transmitting information between the foregoing components. The internal connection 1002 may be a board, a bus, or the like. The bus may be a Peripheral Component Interconnect (PCI) bus, an Extended Industry Standard Architecture (EISA) bus, or the like. Buses may be classified into an address bus, a data bus, a control bus, and the like. For ease of representation, only one thick line is for representing the bus in FIG. 10, but this does not mean that there is only one bus or only one type of bus.

at least one network interface 1004 uses any apparatus such as a transceiver, and is configured to communicate with another device or a communication network. The communication network may be an Ethernet, a radio access network, a WLAN, or the like. The network interface 1004 may include a wired communication interface, and may further include a wireless communication interface. Specifically, the network interface 1004 may be an Ethernet interface, a fast Ethernet (FE) interface, a gigabit Ethernet (GE) interface, an asynchronous transfer mode (ATM) interface, a WLAN interface, a cellular network communication interface, or a combination thereof. The Ethernet interface may be an optical interface, an electrical interface, or a combination thereof. In this embodiment of this application, the network interface 1004 may be used by the device 1000 to communicate with another device.

The memory 1003 may be a read-only memory (ROM) or another type of static storage device that can store static information and instructions, or a random-access memory (RAM) or another type of dynamic storage device that can store information and instructions, or may be an electrically-erasable programmable read-only memory (EEPROM), a compact disc read-only memory (CD-ROM) or another compact disc storage, an optical disc storage (including a compact optical disc, a laser disc, an optical disc, a digital versatile disc, a BLU-RAY disc, or the like), a magnetic disk storage medium or another magnetic storage device, or any other medium that can be used to carry or store expected program code in a form of instructions or a data structure and that can be accessed by a computer. However, this is not limited thereto. The memory may exist independently, and is connected to the processor through the bus. Alternatively, the memory 1003 may be integrated with the processor 1001.

During specific implementation, in an embodiment, the processor 1001 may include one or more CPUs, for example, a CPU 0 and a CPU 1 in FIG. 10. Each of the CPUs may be a single-core processor, or may be a multi-core processor. The processor herein may be one or more devices, circuits, and/or processing cores configured to process data (for example, computer program instructions).

During specific implementation, in an embodiment, the device 1000 may include a plurality of processors, for example, the processor 1001 and a processor 1007 in FIG. 10. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the device 1000 may further include an output device and an input device. The output device communicates with the processor 1001, and may display information in a plurality of manners. For example, the output device may be a liquid-crystal display (LCD), a light-emitting diode (LED) display device, a cathode-ray tube (CRT) display device, or a projector. The input device communicates with the processor 1001, and may receive an input from a user in a plurality of manners. For example, the input device may be a mouse, a keyboard, a touchscreen device, or a sensing device.

In a specific embodiment, the device 1000 in this embodiment of this application may correspond to the foregoing plurality of embodiments, for example, the first device in the plurality of embodiments corresponding to FIG. 1, FIG. 2, FIG. 5, and FIG. 6. The processor 1001 in the device 1000 reads the instructions in the memory 1003, so that the device 1000 shown in FIG. 10 can perform all or some operations of the first device in the foregoing plurality of embodiments.

Figure 11:
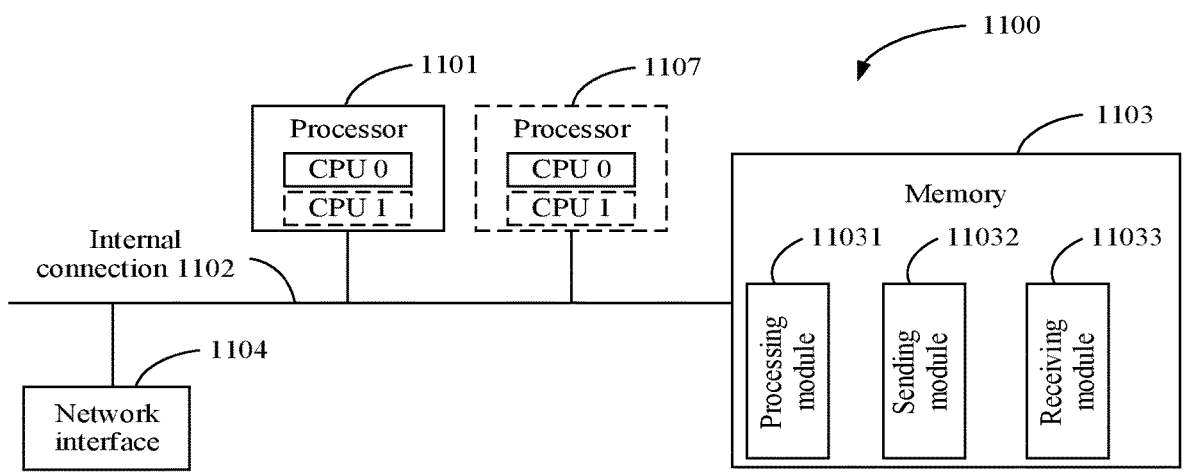
FIG. 11 is a schematic diagram of a structure of another data processing apparatus according to an embodiment of this application.

FIG. 11 is a schematic diagram of a data processing device 1100 according to an embodiment of this application. The device 1100 may be the network element provided in any one of the foregoing embodiments, for example, may be the network element 102 in the network architecture shown in FIG. 1, the network element in the method 400 shown in FIG. 4, the network element in the method 500 shown in FIG. 5, or the network element in the method 600 shown in FIG. 6. The device 1100 includes at least one processor 1101, an internal connection 1102, a memory 1103, and at least one network interface 1104.

The device 1100 is an apparatus of a hardware structure.

In some embodiments, the device 1100 may be configured to implement the functional modules in the apparatus 800 shown in FIG. 8. For example, a person skilled in the art may figure out that the processing unit 801 in the apparatus 800 shown in FIG. 8 may be implemented by using at least one processor 1101 by invoking code in the memory 1103, and the sending unit 802 and the receiving unit 803 in the apparatus 800 shown in FIG. 8 may be implemented by using at least one network interface 1104.

In some embodiments, the memory 1103 is configured to store a program module and data. The program module includes a processing module 11031, a sending module 11032, and a receiving module 11033. In some embodiments, the modules in the memory 1103 in FIG. 11 respectively correspond to the modules shown in FIG. 8. The processor 1101 can perform, by executing computer-readable instructions in each module in the memory 1103, an operation that can be performed by each module shown in FIG. 8.

The device 1100 may be further configured to implement a function of the network element in any one of the foregoing embodiments.

The processor 1101 is, for example, a general-purpose CPU, a DSP, an NP, a GPU, an NPU, a DPU, a microprocessor, or one or more integrated circuits configured to implement the solutions of this application. For example, the processor 1101 includes an ASIC, a PLD or another programmable logic device, a transistor logic device, a hardware component, or any combination thereof. The PLD may be, for example, a CPLD, a FPGA, a GAL, or any combination thereof. The processor may implement or execute various logical blocks, modules, and circuits described with reference to content disclosed in embodiments of this application. Alternatively, the processor may be a combination of processors implementing a computing function, for example, a combination of one or more microprocessors, or a combination of a DSP and a microprocessor.

The internal connection 1102 may include a path for transmitting information between the foregoing components. The internal connection 1102 may be a board, a bus, or the like. The bus may be a PCI bus, an EISA bus, or the like. Buses may be classified into an address bus, a data bus, a control bus, and the like. For ease of representation, only one thick line is for representing the bus in FIG. 11, but this does not mean that there is only one bus or only one type of bus.

at least one network interface 1104 uses any apparatus such as a transceiver, and is configured to communicate with another device or a communication network. The communication network may be an Ethernet, a radio access network, a WLAN, or the like. The network interface 1104 may include a wired communication interface, and may further include a wireless communication interface. Specifically, the network interface 1104 may be an Ethernet interface, a FE interface, a GE interface, an ATM interface, a WLAN interface, a cellular network communication interface, or a combination thereof. The Ethernet interface may be an optical interface, an electrical interface, or a combination thereof. In this embodiment of this application, the network interface 1104 may be used by the device 1100 to communicate with another device.

The memory 1103 may be a ROM or another type of static storage device that can store static information and instructions, or a RAM or another type of dynamic storage device that can store information and instructions, or may be an EEPROM, a CD-ROM or another compact disc storage, an optical disc storage (including a compact optical disc, a laser disc, an optical disc, a digital versatile disc, a BLU-RAY disc, or the like), a magnetic disk storage medium or another magnetic storage device, or any other medium that can be used to carry or store expected program code in a form of instructions or a data structure and that can be accessed by a computer. However, this is not limited thereto. The memory may exist independently, and is connected to the processor through the bus. Alternatively, the memory 1103 may be integrated with the processor 1101.

During specific implementation, in an embodiment, the processor 1101 may include one or more CPUs, for example, a CPU 0 and a CPU 1 in FIG. 11. Each of the CPUs may be a single-core processor, or may be a multi-core processor. The processor herein may be one or more devices, circuits, and/or processing cores configured to process data (for example, computer program instructions).

During specific implementation, in an embodiment, the device 1100 may include a plurality of processors, for example, the processor 1101 and a processor 1107 in FIG. 11. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the device 1100 may further include an output device and an input device. The output device communicates with the processor 1101, and may display information in a plurality of manners. For example, the output device may be a liquid crystal display (LCD), an LED display device, a CRT display device, or a projector. The input device communicates with the processor 1101, and may receive an input from a user in a plurality of manners. For example, the input device may be a mouse, a keyboard, a touchscreen device, or a sensing device.

In a specific embodiment, the device 1100 in this embodiment of this application may correspond to the foregoing plurality of embodiments, for example, the network element in the plurality of embodiments corresponding to FIG. 1, FIG. 4, FIG. 5, and FIG. 6. The processor 1101 in the device 1100 reads the instructions in the memory 1103, so that the device 1100 shown in FIG. 11 can perform all or some operations of the network element in the foregoing plurality of embodiments.

An operation sequence in the specification, claims, and accompanying drawings of this application is not limited to a specific order or sequence in the description. It should be understood that the data termed in such a way is performed simultaneously or interchangeable in order in proper circumstances so that described embodiments can be implemented in other orders than the order illustrated or described in the accompanying drawings.

A person of ordinary skill in the art may understand that all or some of the steps of the foregoing embodiments may be implemented by hardware or a program instructing related hardware. The program may be stored in a computer-readable storage medium. The storage medium may be a read-only memory, a magnetic disk, an optical disc, or the like.

The foregoing descriptions are only optional embodiments of this application, but are not intended to limit this application. Any modification, equivalent replacement, or improvement made within the principle of this application should fall within the protection scope of this application.

What is claimed is:

1. A data processing method, comprising:
    receiving a first dataset from a network element, wherein the first dataset comprises a plurality of pieces of first data;
    obtaining, based on the first dataset, at least one data feature corresponding to the pieces of first data; and
    sending trigger information to the network element in response to obtaining the at least one data feature, wherein the trigger information comprises at least one of the at least one data feature or at least one feature type that is related to the at least one data feature, wherein the at least one data feature comprises one or more of a data waveform feature corresponding to the pieces of first data, a data content feature in the first dataset, or an object identifier of at least one second object, and wherein the at least one second object comprises an object for obtaining each piece of the pieces of first data.

2. The data processing method of claim 1, further comprising obtaining the at least one feature type based on the at least one data feature and a first correspondence comprising the at least one data feature and the at least one feature type.

3. The data processing method of claim 2, further comprising obtaining the at least one feature type based on at least one data type, wherein the at least one data type comprises a type to which the pieces of first data belong, and wherein the first correspondence comprises at least one of the at least one data feature, the at least one data type, or the at least one feature type.

4. The data processing method of claim 1, wherein the trigger information comprises at least one of the at least one data feature or at least one data type, and wherein the at least one data type comprises the type to which the pieces of first data belongs.

5. The data processing method of claim 1, wherein the trigger information further comprises an object identifier of at least one first object, and wherein the at least one first object is located in the network element.

6. The data processing method of claim 1, wherein the data processing method is executed by a data processing system, a controller, or a management device.

7. The data processing method of claim 1, wherein the first dataset comprises a second dataset or partial data in a second dataset, and wherein the second dataset comprises data obtained after receiving the first dataset from the network element.

8. A data processing system, comprising:
    a memory configured to store program instructions; and
    at least one processor coupled to the memory and configured to execute the program instructions to cause the data processing system to:
        obtain a first dataset, wherein the first dataset comprises a plurality of pieces of first data;
        obtain, based on the first dataset, at least one data feature corresponding to the pieces of first data;
        send trigger information in response to obtaining the at least one data feature, wherein the trigger information comprises at least one of the at least one data feature or at least one feature type, and wherein the at least one feature type is based on the at least one data feature, wherein the trigger information comprises the at least one data feature, and wherein the at least one processor is further configured to execute the program instructions to cause the data processing system to obtain the at least one feature type based on the at least one data feature and a first correspondence, and wherein the first correspondence comprises the at least one data feature and the at least one feature type;
        obtain the at least one feature type based on the trigger information; and obtain a data metric based on the at least one feature type and a second dataset, wherein the second dataset comprises a plurality of pieces of second data.

9. The data processing system of claim 8, wherein the at least one processor is further configured to execute the program instructions to cause the data processing system to obtain the at least one feature type based on the at least one data feature and a first correspondence comprising the at least one data feature and the at least one feature type.

10. The data processing system of claim 9, wherein the at least one processor is further configured to execute the program instructions to cause the data processing system to obtain the at least one feature type based on at least one data type, wherein the at least one data type comprises a type to which the pieces of first data belong, and wherein the first correspondence comprises at least one of the at least one data feature, the at least one data type, or the at least one feature type.

11. A data processing apparatus, comprising:
a memory configure to store program instructions; and
at least one processor coupled to the memory and configured to execute the program instructions to cause the data processing system to:
receive a first dataset from a network element, wherein the first dataset comprises a plurality of pieces of first data;
obtain, based on the first dataset, at least one data feature corresponding to the pieces of first data; and
send trigger information to the network element in response to obtaining the at least one data feature,
wherein the trigger information comprises at least one of the at least one data feature or at least one feature type that is related to the at least one data feature, wherein the at least one data feature comprises one or more of a data waveform feature corresponding to the pieces of first data, a data content feature in the first dataset, and an object identifier of at least one second object, and wherein the at least one second object comprises an object for obtaining each piece of first data in the first dataset.

12. The data processing apparatus of claim 11, wherein the at least one processor is further configured to execute the program instructions to cause the data processing apparatus to obtain the at least one feature type based on the at least one data feature and a first correspondence comprising the at least one data feature and the at least one feature type.

13. The data processing apparatus of claim 12, wherein the at least one processor is further configured to execute the program instructions to cause the data processing apparatus to obtain the at least one feature type based on at least one data type, wherein the at least one data type comprises a type to which the pieces of first data belong, and wherein the first correspondence comprises at least one of the at least one data feature, the at least one data type, or the at least one feature type.

14. The data processing apparatus of claim 11, wherein the trigger information comprises at least one of the at least one data feature or at least one data type, and wherein the at least one data type comprises the type to which the pieces of first data belongs.

15. The data processing apparatus of claim 11, wherein the trigger information further comprises an object identifier of at least one first object, and wherein the at least one first object is located in the network element.

16. The data processing apparatus of claim 11, wherein the data processing apparatus comprises a data processing system, a controller, or a management device.

17. The data processing apparatus of claim 11, wherein the first dataset comprises a second dataset or partial data in a second dataset, and wherein the second dataset comprises data obtained after receiving the first dataset from the network element.

* * * * *